United States Patent
Hasegawa

(10) Patent No.: US 9,019,572 B2
(45) Date of Patent: Apr. 28, 2015

(54) IMAGE-READING DEVICE, IMAGE-READING METHOD AND COMPUTER READABLE STORAGE MEDIUM

(71) Applicants: Casio Computer Co., Ltd., Shibuya-ku, Tokyo (JP); Casio Electronics Manufacturing Co., Ltd., Iruma-shi, Saitama (JP)

(72) Inventor: Hirokazu Hasegawa, Koganei (JP)

(73) Assignees: Casio Computer Co., Ltd., Tokyo (JP); Casio Electronics Manufacturing Co., Ltd., Iruma-shi, Saitama (JP)

( * ) Notice: Subject to any disclaimer, the term of this patent is extended or adjusted under 35 U.S.C. 154(b) by 0 days.

(21) Appl. No.: 14/108,043

(22) Filed: Dec. 16, 2013

(65) Prior Publication Data

US 2014/0177011 A1    Jun. 26, 2014

(30) Foreign Application Priority Data

Dec. 21, 2012 (JP) ................................ 2012-278894
Mar. 21, 2013 (JP) ................................ 2013-057867

(51) Int. Cl.
  *H04N 1/04* (2006.01)
  *H04N 1/195* (2006.01)
  *H04N 1/38* (2006.01)
  *B42D 9/06* (2006.01)

(52) U.S. Cl.
  CPC .... *H04N 1/19594* (2013.01); *H04N 2201/0434* (2013.01); *H04N 1/38* (2013.01); *B42D 9/06* (2013.01)

(58) Field of Classification Search
  CPC ... H04N 1/38; H04N 1/3873; H04N 1/00795; H04N 1/40; H04N 2201/3225; H04N 1/403; H04N 1/4076; H04N 1/40056; H04N 1/4072; G06K 9/38
  USPC .............. 358/474, 471, 408, 505, 909.1, 453, 358/464; 382/282
  See application file for complete search history.

(56) References Cited

U.S. PATENT DOCUMENTS

| | | | |
|---|---|---|---|
| 6,011,635 A * | 1/2000 | Bungo et al. ................... | 382/199 |
| 7,639,406 B1 * | 12/2009 | Proudfoot et al. ............. | 358/474 |
| 8,072,650 B1 * | 12/2011 | Starns et al. ................... | 358/447 |
| 8,390,896 B2 | 3/2013 | Oiwa et al. | |
| 2012/0206778 A1 * | 8/2012 | Shirai et al. ................... | 358/474 |
| 2013/0021654 A1 * | 1/2013 | Ogawa et al. ................. | 358/474 |
| 2013/0250379 A1 * | 9/2013 | Rigazio et al. ................ | 358/538 |

FOREIGN PATENT DOCUMENTS

| | | |
|---|---|---|
| JP | 2006-114993 A | 4/2006 |
| JP | 2010-109448 A | 5/2010 |

* cited by examiner

*Primary Examiner* — Cheukfan Lee
(74) *Attorney, Agent, or Firm* — Holtz, Holtz, Goodman & Chick PC

(57) ABSTRACT

An image-reading device images each page of a book as a basic image and cuts out a predetermined area of the basic image. The device includes an initial-parameter specification unit, a final-parameter specification unit, a determination unit and a correction unit. The initial-parameter specification unit specifies a parameter for the predetermined area of a page around beginning of turning pages. The final-parameter specification unit specifies a parameter for the predetermined area of a page around an end of turning pages. The determination unit determines a parameter for a certain page of the book on the basis of the parameters specified by the initial-parameter specification unit and the final-parameter specification unit. The correction unit corrects an image of the certain page on the basis of the parameter determined by the determination unit.

12 Claims, 31 Drawing Sheets

IMAGE-READING DEVICE, IMAGE-READING METHOD AND COMPUTER READABLE STORAGE MEDIUM

CROSS REFERENCE TO RELATED APPLICATION

This application is based upon and claims the benefit of priority under 35 USC 119 of Japanese Patent Application No. 2012-278894 filed on Dec. 21, 2012 and Japanese Patent Application No. 2013-057867 filed on Mar. 21, 2013, the entire disclosure of which, including the descriptions, claims, drawings and abstracts, is incorporated herein by reference in its entirety.

BACKGROUND OF THE INVENTION

1. Field of the Invention

The present invention relates to an image-reading device, an image-reading method and a computer readable storage medium.

2. Description of Related Art

Conventionally, as shown in FIG. 35 for example, there is known an image-reading device 200 which has an imaging unit 201 above an opened book B. The imaging unit 201 reads each page P of the book B as an image. Since books B vary in size, the image-reading device 200 has a function of specifying a document size R to cut out only a necessary area of an image G10 picked up by the imaging unit 201 as shown in FIG. 36 in order to execute reading processing in accordance with sizes of books B. It is disclosed, for example, in Japanese Patent Application Laid-Open Publication No. 2006-114993.

SUMMARY OF THE INVENTION

A distance H between the imaging unit 201 and a page P differs between a case where the first page P of the book B is read as shown in FIG. 35 and FIG. 36 and a case where the last page P of the book B is read as shown in FIG. 37 and FIG. 38. Therefore, even if a document size R is specified before reading, the document size R does not coincides with an area R1 of the last page P to be cut out. There is a problem that trimmed images cannot be uniform.

Hence, objects of the present invention include keeping uniformity of trimmed images from the first page to the last page of a book.

In order to achieve at least one of the objects, according to a first aspect of the present invention, there is provided an image-reading device turning pages of a book, imaging each page of the book as a basic image using an imaging unit, and cutting out a predetermined area of the basic image to import as a trimmed image, including: an initial-parameter specification unit which specifies a parameter for the predetermined area of a page around a beginning of turning pages; a final-parameter specification unit which specifies a parameter for the predetermined area of a page around an end of turning pages; a determination unit which determines a parameter for a certain page of the book on the basis of the parameters specified by the initial-parameter specification unit and the final-parameter specification unit; and a correction unit which corrects an image of the certain page on the basis of the parameter determined by the determination unit.

In order to achieve at least one of the objects, according to a second aspect of the present invention, there is provided an image-reading method for turning pages of a book, imaging each page of the book as a basic image using an imaging unit, and cutting out a predetermined area of the basic image to import as a trimmed image, including: an initial-parameter specification processing of specifying a parameter for the predetermined area of a page around a beginning of turning pages; a final-parameter specification processing of specifying a parameter for the predetermined area of a page around an end of turning pages; a determination processing of determining a parameter for a certain page of the book on the basis of the parameters specified in the initial-parameter specification processing and the final-parameter specification processing; and a correction processing of correcting an image of the certain page on the basis of the parameter determined in the determination processing.

In order to achieve at least one of the objects, according to a third aspect of the present invention, there is provided a non-transitory computer readable storage medium having a program stored thereon for turning pages of a book, imaging each page of the book as a basic image using an imaging unit, and cutting out a predetermined area of the basic image to import as a trimmed image, the program including computer-executable instructions to perform: an initial-parameter specification processing of specifying a parameter for the predetermined area of a page around a beginning of turning pages; a final-parameter specification processing of specifying a parameter for the predetermined area of a page around an end of turning pages; a determination processing of determining a parameter for a certain page of the book on the basis of the parameters specified in the initial-parameter specification processing and the final-parameter specification processing; and a correction processing of correcting an image of the certain page on the basis of the parameter determined in the determination processing.

BRIEF DESCRIPTION OF THE DRAWINGS

The present invention will become more fully understood from the detailed description given hereinafter and the appended drawings, which are given by way of illustration only and thus are not intended as a definition of the limits of the present invention, wherein.

DETAILED DESCRIPTION OF THE PREFERRED EMBODIMENT

Hereinafter, an embodiment of the present invention will be described with reference to the drawings. Though various technical limitations which are preferable to carry out the present invention are added to the after-described embodiment, the scope of the invention is not limited to the following embodiment and the illustrated examples.

Figure 1:
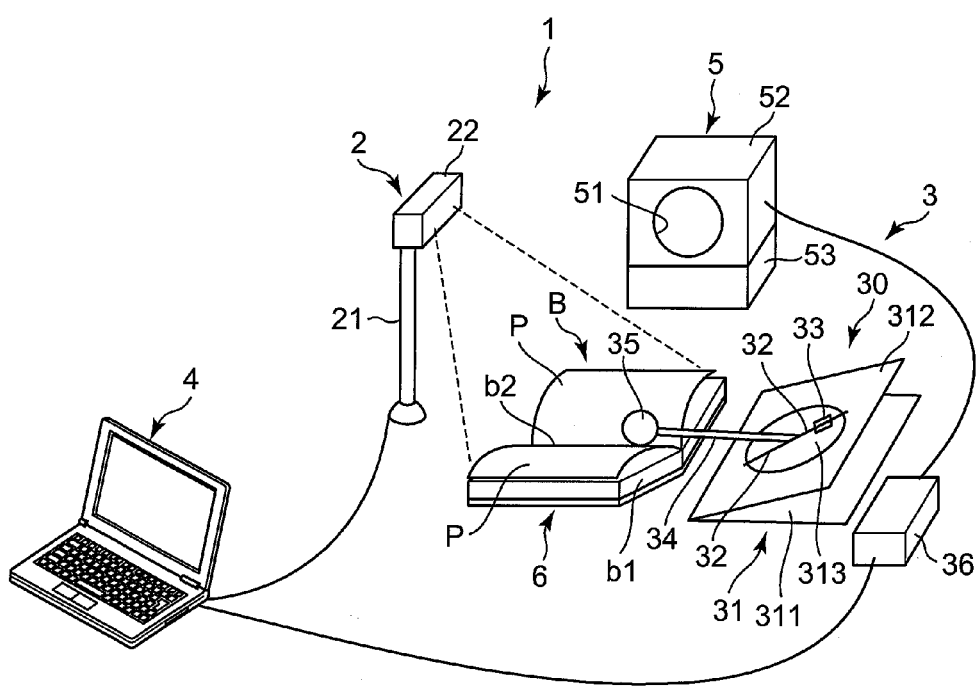
FIG. 1 is a perspective view schematically showing the configuration of a document camera system according to an embodiment of the present invention.
Figure 2A:
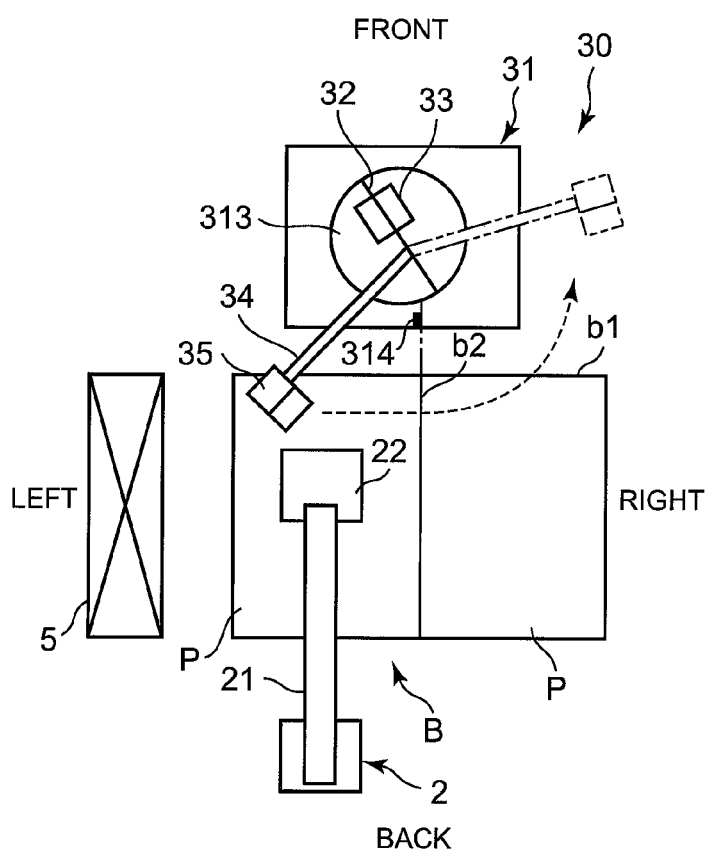
FIG. 2A is a top view showing the configuration of the essential part of the document camera system in FIG. 1.
Figure 2B:
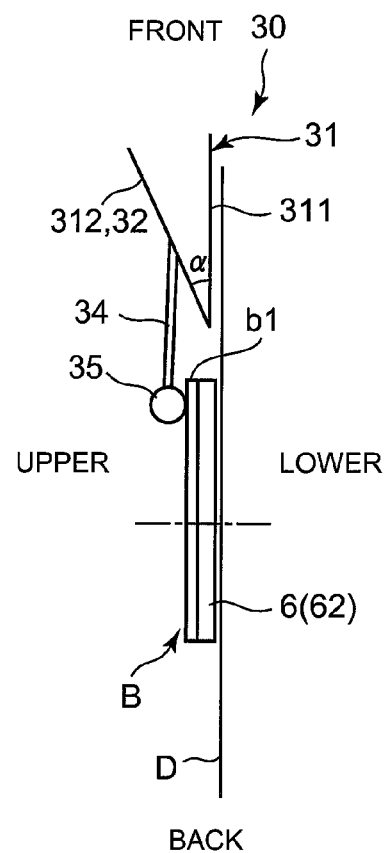
FIG. 2B is a side view showing the configuration of the essential part of the document camera system in FIG. 1.
Figure 3:
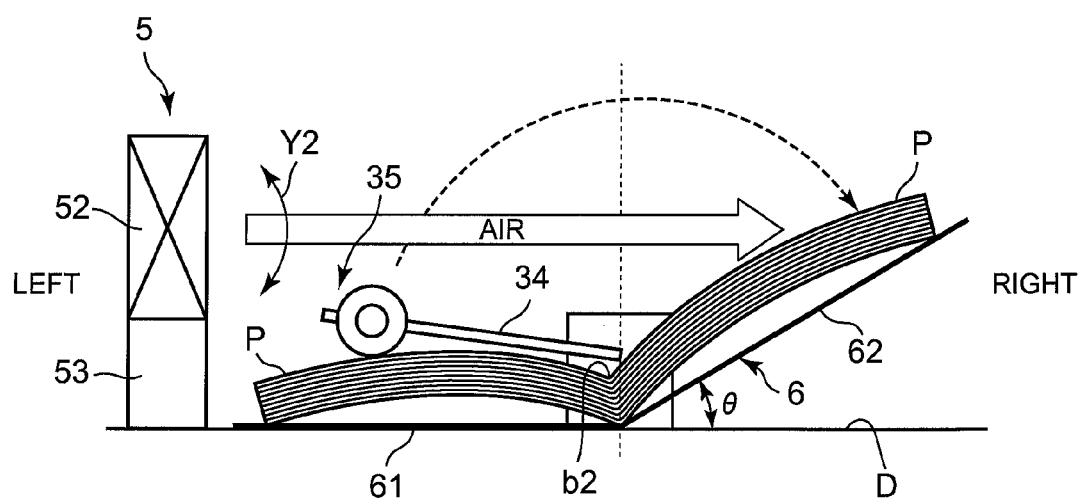
FIG. 3 is an elevation view showing a route of a sticking part provided on the top end of an arm part according to the embodiment.

FIG. 1 is a perspective view schematically showing the configuration of a document camera system as an image-reading device according to the present invention. FIG. 2A and FIG. 2B illustrate the configuration of the essential part of the document camera system, wherein FIG. 2A is a top view, and FIG. 2B is a side view. FIG. 3 is an elevation view showing the essential part of the document camera system. In the explanation hereinafter, pages P of a book B are turned from left to right.

As shown in FIG. 1 to FIG. 3, a document camera system 1 includes: a document camera 2 as an image pickup unit which picks up images of pages P of the book B; a page-turning device 3 which turns pages P of the book B; and a personal computer 4 connected to the document camera 2 and the page-turning device 3 such that the computer 4 can communicate with the document camera 2 and the page-turning device 3.

The document camera 2 includes a stand part 21 and a camera 22 attached to the upper end of the stand part 21. The stand part 21 is inclinable in the front-back direction and the left-right direction, and extensible in the up-down direction, so that a positional relationship of the book B and the camera 22 can be adjusted. A lens of the camera 22 faces downward such that the book B comes within an angle of view. A position-adjustment mechanism is disposed at the joining portion of the camera 22 and the stand part 21, so that the facing direction of the lens of the camera 22 can be adjusted.

In this embodiment, the camera 22 is positioned above the left pages P to image only the left pages P.

The page-turning device 3 includes: a support base 6 which supports the book B being opened; a turning unit 30 which holds a page P at a departure position of pages P of the book B and which releases the holding of the page P at a destination position of pages P; a blower 5 which sends air above a page P at the departure position to blow against a page P at the destination position; and a control unit 36 which controls these parts and the like.

As shown in FIG. 3, the support base 6 includes a couple of support plates 61, 62. The support base 6 can be folded up by using a hinge, which is not shown in drawings. When pages P of the book B are turned from left to right as shown in FIG. 3, a first support plate 61 of the support plates 61, 62 which is disposed on the left is laid on the desk D, and a second support plate 62 which is disposed on the right is placed on the desk D such that the second support plate 62 is inclined at a predetermined angle as if the second support plate 62 approaches the first support plate 61. Pages P at the departure position is placed on the first support plate 61, while pages P at the destination position is placed on the second support plate 62.

When pages P of the book B are turned from right to left, the second support plate 62 which is disposed on the right is laid on the desk D, and the first support plate 61 which is disposed on the left is placed on the desk D such that the first support plate 61 is inclined at a predetermined angle as if the first support plate 61 approaches the second support plate 62.

Pages P at the departure position is placed on the second support plate 62, while pages P at the destination position is placed on the first support plate 61.

Thereby, the support base 6 supports the book B such that a destination position inclined angle between the pages P at the destination position and an horizontal plane is larger than a departure position inclined angle between the pages P at the departure position and the horizontal plane. Since the support base 6 can be folded up by using a hinge between the support plates 61, 62, an angle between the support plates 61, 62 is adjustable. Therefore the destination position inclined angle θ between the pages P at the destination position and the horizontal plane is adjustable. The destination position inclined angle θ is preferably adjusted to 30 to 45 degrees.

The turning unit 30 includes: a base 31; a first drive unit (drive unit) 33, such as a motor, disposed on the base 31 and having a drive shaft 32; an arm part 34 which swings around the drive shaft 32; and a sticking part 35 attached to the top end of the arm part 34, the sticking part 35 sticking to or separating from a page P of the book B.

The base 31 is disposed on a desk D such that one side of the base 31 is parallel to the upper side b1 of the book B opened on the support base 6. In the explanation hereinafter, "back" is defined as a side where the book B is disposed, i.e. the book B side, and "front" is defined as a side where the base 31 is disposed, i.e. the base 31 side. The seam b2 of the book B is along the front-back direction. The base 31 includes a main base 311 and a sub base 312 which is superposed on the main base 311 and can adjust an angle α between the main base 311 and the sub base 312. On the back end (the end on the book B side) of the sub base 312, a hinge (not shown) is disposed. This hinge makes the angle α between the sub base 312 and the main base 311 adjustable. The sub base 312 is provided with a rotating plate 313 which is rotatable and supports the first drive unit 33. The drive shaft 32 of the first drive unit 33 is disposed parallel to the upper surface of the rotating plate 313.

When pages P of the book B are turned from left to right, the angle of the rotating plate 313 is determined such that the back end (the end on the book B side) of the drive shaft 32 turns to right-hand side with respect to the seam b2 of pages P and the front end (the end on a side opposite to the book B side) of the drive shaft 32 as the base end turns to left-hand side with respect to the seam b2 of pages P. On the other hand, when pages P of the book B are turned from right to left, the angle of the rotating plate 313 is determined such that the back end (the end on the book B side) of the drive shaft 32 turns to left-hand side with respect to the seam b2 of pages P and the front end (the end on the side opposite to the book B side) of the drive shaft 32 turns to right-hand side with respect to the seam b2 of pages P.

Whichever the turning direction is, the drive shaft 32 is inclined such that the base end of the drive shaft 32 is on a side where a departure position of pages P exists (departure position side) with respect to the seam b2 of the book B and also inclined at the angle α with respect to a plane on which the book B is put (horizontal plane).

Also, a mark 314 for locating is formed at the back end (the end on the book B side) of the sub base 312. It is preferable to locate the base 31 such that this mark 314 is on the extension of the seam b2.

The arm part 34 is inclined with respect to the drive shaft 32 toward the book B side. As the drive shaft 32 rotates, the arm part 34 goes to and fro (shuttle operation) between the departure position and a destination position of pages P as if the arm part 34 draws a circular arc around the drive shaft 32. That is to say, the drive shaft 32 is a symmetry axis of swing of the arm part 34. In the explanation hereinafter, a movement from the departure position to the destination position of pages P is referred to as an outward movement (a motion of going), and a movement from the destination position to the departure position is referred to as a homeward movement (a motion of return).

FIG. 3 is an elevation view (viewed in a direction along an axis of the seam b2 of pages P or viewed from a plane side, the normal line of which is parallel to the seam b2) showing a route of the sticking part 35 provided on the top end of the arm part 34. As shown in FIG. 3, in the outward movement, the sticking part 35 on the top end of the arm part 34 moves from a position which contacts the departure position of pages P to the destination position of pages P as if the sticking part 35 draws a circular arc over pages P.

Figure 4A:
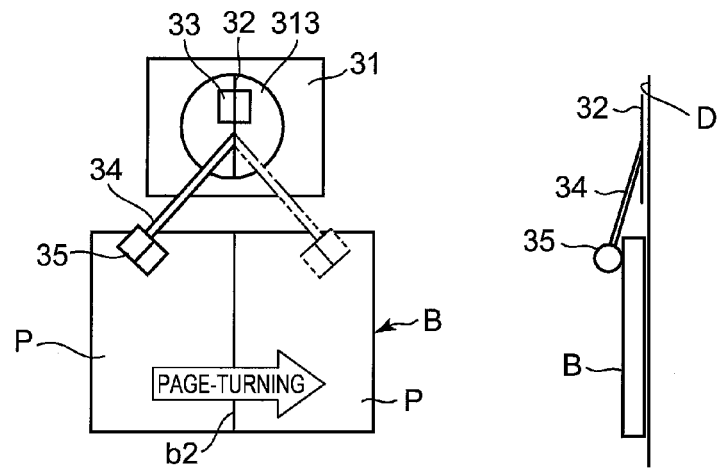
FIG. 4A, FIG. 4B and FIG. 4C schematically illustrate how inclination of a drive shaft of a first drive unit according to the embodiment affects a page-turning operation.
Figure 4B:
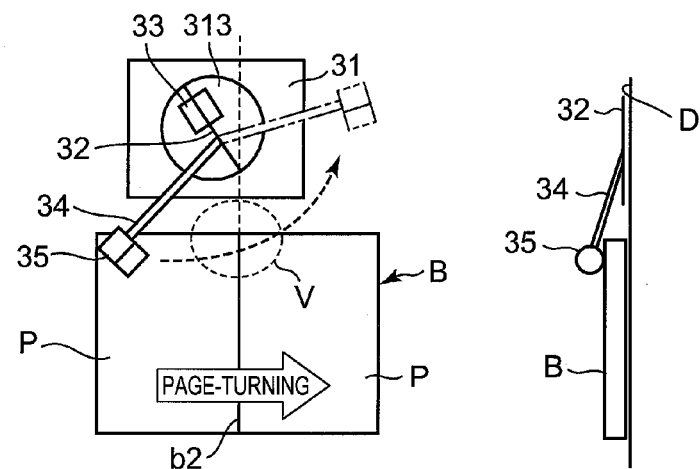
Figure 4C:
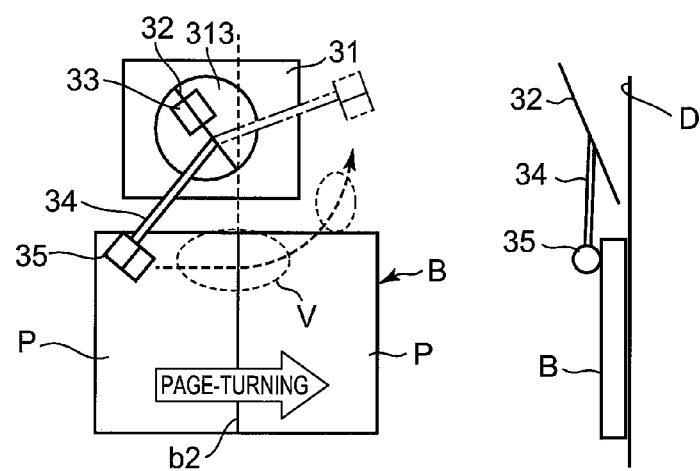

FIG. 4A, FIG. 4B and FIG. 4C schematically illustrate how the inclination of the drive shaft 32 affects the page-turning operation of pages P. FIG. 4A, FIG. 4B and FIG. 4C show the book B placed not on the support base 6 but directly on the desk D so that the configuration can be easily understood. FIG. 4A illustrates a case where the drive shaft 32 is horizontally disposed on the extension of the seam b2. In this case, since the sticking part 35 moves along a route the symmetry axis of which corresponds to the seam b2, the sticking part 35 keeps in contact with the right-side page P at the destination position of pages P without being able to separate from the page P.

FIG. 4B illustrates a case where the drive shaft 32 is horizontal and inclined such that the back end of the drive shaft 32 turns to right-hand side with respect to the seam b2 of pages P and the front end of the drive shaft 32 as the base end turns to left-hand side with respect to the seam b2 of pages P. In this case, after the sticking part 35 sticks to a page P at the departure position, the arm part 34 rotates around the drive shaft 32, and at the end point of the outward movement, the sticking part 35 separates from the book B forward. Therefore, the sticking part 35 can easily separate from the sticking page P.

In this case, however, pages P cannot always be turned smoothly. One possible cause is that the distance between the book B and the sticking part 35 becomes long in the first phase to the middle phase (the ellipse V) of the page-turning operation.

FIG. 4C illustrates a case where the drive shaft 32 is inclined with respect to the seam b2 of the book B and is also inclined with respect to the horizontal plane, i.e. a case of the drive shaft 32 according to the embodiment. In this case, the distance between the book B and the sticking part 35 in the first phase to the middle phase (the ellipse V) of the page-turning is shorter than that in the case shown in FIG. 4B.

Figure 5A:
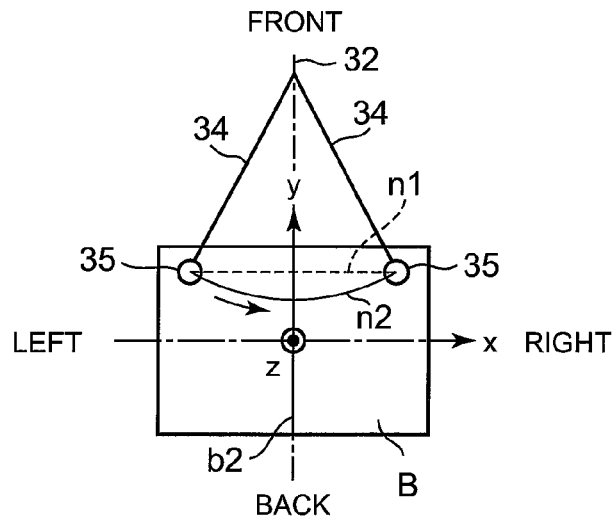
FIG. 5A, FIG. 5B and FIG. 5C are respectively a top view, a side view and an elevation view, schematically showing difference of routes of the sticking part between a case where the drive shaft of the first drive unit is horizontal and a case where the drive shaft is inclined with respect to the vertical line standing perpendicular to the seam.
Figure 5B:
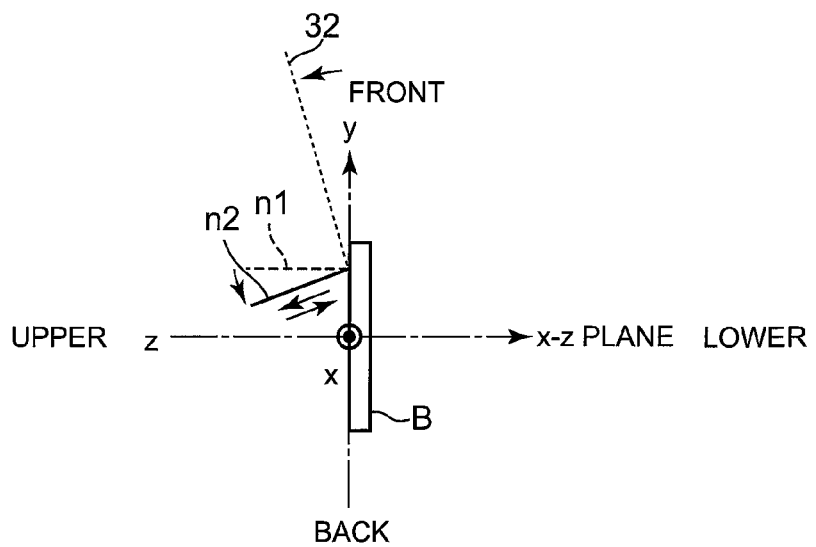
Figure 5C:
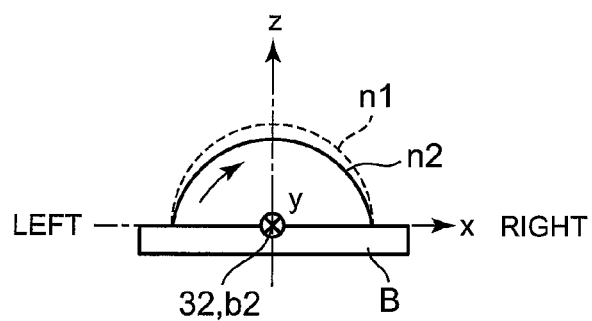

To be more specific, FIG. 5A, FIG. 5B and FIG. 5C schematically illustrate difference of routes of the sticking part 35 between a case where the drive shaft 32 is horizontal and a case where the drive shaft 32 is inclined with respect to the horizontal plane, wherein FIG. 5A is a top view, FIG. 5B is a side view, and FIG. 5C is an elevation view. In FIG. 5A, FIG. 5B and FIG. 5C, the left-right direction, the up-down direction and the vertical direction of the book B are respectively defined as an x direction, a y direction and a z direction. In FIG. 5A, FIG. 5B and FIG. 5C, the drive shaft 32 aligns with the seam b2 of the book B in order to clarify the point that the drive shaft 32 of the embodiment is inclined with respect to the horizontal plane. As shown in FIG. 5A, FIG. 5B and FIG. 5C, in the case where the drive shaft 32 is horizontal (dot lines in the figures), the locus n1 of the sticking part 35 is a straight line along the left-right direction in the top view (FIG. 5A), a straight line along the vertical direction in the side view (FIG.

5B) and a semicircle in the elevation view (FIG. 5C). On the other hand, in the case where the drive shaft 32 is inclined with respect to the horizontal plane (solid lines in the figures), the locus n2 of the sticking part 35 is a circular arc being convex backward in the top view (FIG. 5A), a straight line with its upper end being inclined backward in the side view (FIG. 5B) and a deformed semicircle in the elevation view (FIG. 5C). The locus n2 in FIG. 5B shows the locus plane of the driven sticking part 35 viewed from the side. It shows that the locus n2 is inclined with respect to a plane (x-z plane) including the left-right direction of the book B and a normal line of the book B.

As is known from FIG. 5C, the distance from the sticking part 35 to the seam b2 when the sticking part 35 passes over the seam b2 is shorter than the distance from the sticking part 35 to the seam b2 when the sticking part 35 sticks to a page P at the departure position. That is to say, the locus n2 can make the distance from the book B to the sticking part 35 when the sticking part 35 passes over the seam b2 shorter than the locus n1.

Thus, according to the embodiment shown in FIG. 4C, in the second phase of the page-turning, the distance between the book B (the seam b2) and the sticking part 35 becomes long, so that the sticking part 35 can easily separate from the sticking page P. Also, in the first phase to the middle phase (the ellipse V) of the page-turning operation, the distance between the book B (the seam b2) and the sticking part 35 becomes short, so that a page P can be slackened appropriately. Therefore, pages P can be reliably turned.

In the homeward movement, the moving direction is opposite to that in the outward movement, and the sticking part 35 takes the same route as that of the outward movement, moves keeping a distance from pages P and, in the end, sticks to another page P at the departure position of pages P. Repeating this shuttle operation progresses the page-turning operation of pages P.

In the present embodiment, the drive shaft 32 is inclined with respect to the seam b2 of the opened book B and is also inclined with respect to the horizontal plane as shown in FIG. 4C as an example. It is needless to say that if the drive shaft 32 is inclined with respect to either the seam b2 or the horizontal plane, these cases have their respective effects.

If the drive shaft 32 is inclined only with respect to the horizontal plane, as described later, a second drive unit 37 is driven or the sticking part 35 is configured in such a way as to stay at a higher position on the right than that on the left so that the sticking part 35 can easily separate from a page P.

Figure 6:
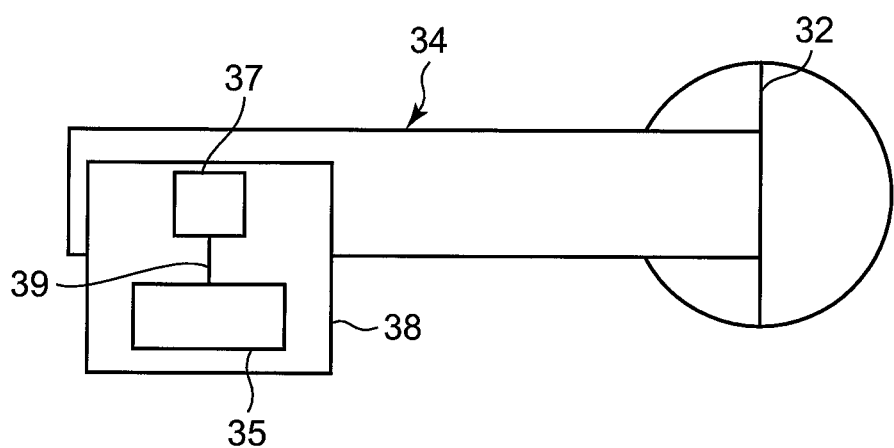
FIG. 6 is a schematic view schematically showing the configuration of the arm part according to the embodiment.

Next, specific configurations of the arm part 34 and the sticking part 35 will be explained. FIG. 6 is a schematic diagram schematically showing the configuration of the arm part 34. The arm part 34 is a plate component the base end of which is attached to the drive shaft 32 as shown in FIG. 6. The sticking part 35 is attached to the top end of the arm part 34 via the second drive unit 37 such as a motor.

The second drive unit 37 is disposed such that a drive shaft 39 of the second drive unit 37 is along a direction perpendicular to the longitudinal direction of the arm part 34. The sticking part 35 is removably attached to the drive shaft 39, and the sticking part 35 rotates as the drive shaft 39 rotates.

Figure 7:
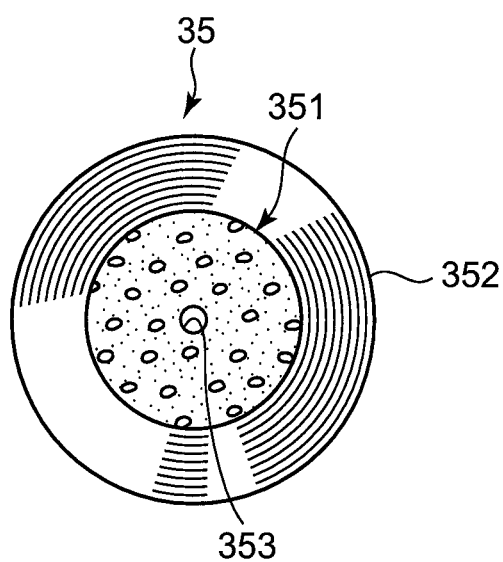
FIG. 7 is an elevation view schematically showing the configuration of the sticking part according to the embodiment.

FIG. 7 is an elevation view schematically showing the configuration of the sticking part 35. As shown in FIG. 7, the sticking part 35 includes a columnar rotating roller 351 and an adhesive component 352 wound around the rotating roller 351.

There has been desire to improve working efficiency in replacement of the sticking parts 35 with respect to the drive shaft 39 of the second drive unit 37. Hence, the rotating roller 351 is made of an elastic body such as a sponge, and a fit hole 353 into which the drive shaft 39 is fitted is formed at the center of the rotating roller 351. Other than the sponge, examples of the elastic body include rubber and foam. The inner diameter of the fit hole 353 is formed to be smaller than the outer diameter of the drive shaft 39. By pushing the drive shaft 39 into the fit hole 353, the rotating roller 351 contracts, and the drive shaft 39 fits in the fit hole 353. Consequently, at the replacement, the rotating roller 351 can be removed from the drive shaft 39 only by pulling the rotating roller 351 to be detached from the drive shaft 39. Thus, since the rotating roller 351 is elastic, the sticking part 35 can be easily put on and removed from the drive shaft 39, and accordingly the sticking part 35 can be easily replaced with another.

Figure 8:
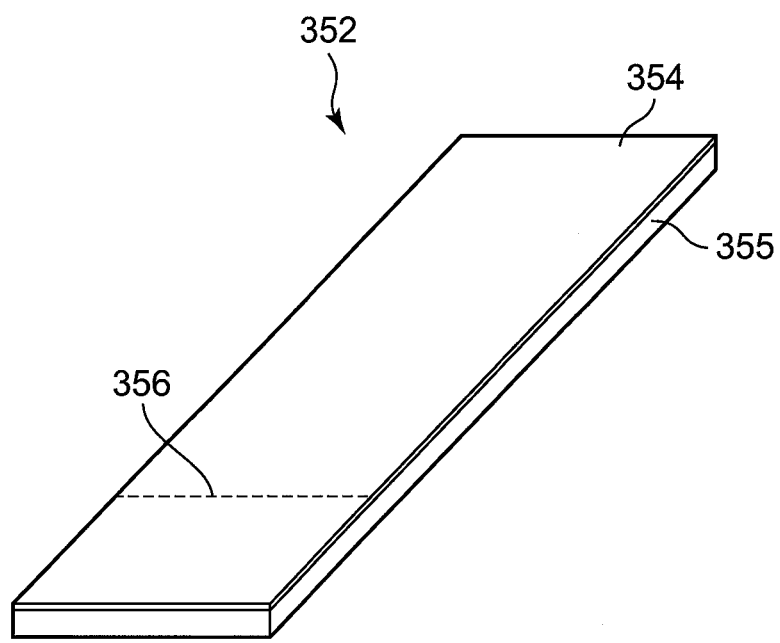
FIG. 8 is a perspective view schematically showing the structure of an adhesive component according to the embodiment.

FIG. 8 is a perspective view schematically showing the configuration of the adhesive component 352. As shown in FIG. 8, the adhesive component 352 is sheet-shaped and has, for example, a double-sided adhesive structure like a double-sided tape. The adhesive component 352 has a two-layer structure of a weak adhesive layer 354 and a strong adhesive layer 355. The weak adhesive layer 354 is provided on a side which sticks to the book B (surface side). The weak adhesive layer 354 has: weak adhesive power so that pieces of the weak adhesive layer 354 do not remain after the adhesive component 352 is removed; and a property that the weak adhesive layer 354 can be used multiple times. On the other hand, the strong adhesive layer 355 is provided on the opposite side. The strong adhesive layer 355 has adhesive power stronger than the weak adhesive layer 354 so that the strong adhesive layer 355 maintains a state of being wound around the rotating roller 351. Perforations 356 are formed at predetermined length intervals on the adhesive component 352.

Figure 9A:
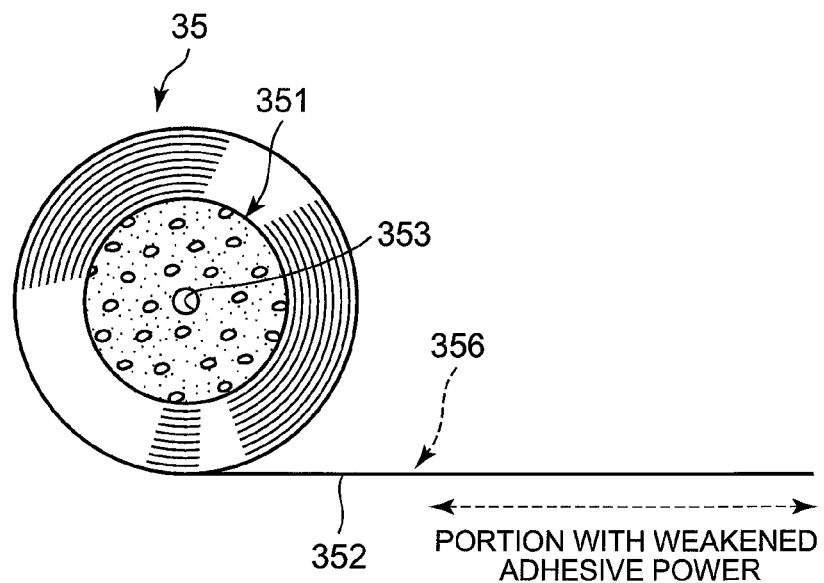
FIG. 9A and FIG. 9B illustrate a process of removing the adhesive component when the adhesive power has weakened.
Figure 9B:
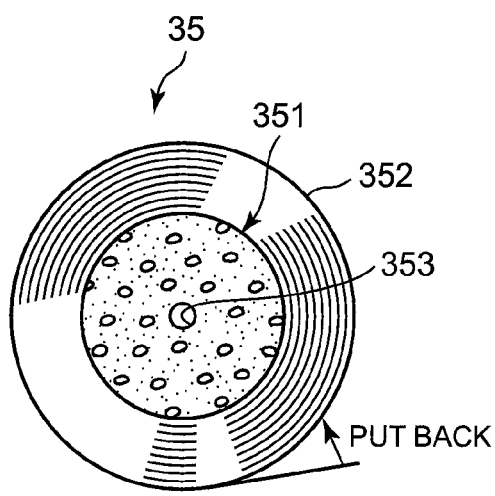

FIG. 9A and FIG. 9B illustrate a process of removing the adhesive component 352 when the adhesive power has weakened. When a user feels that the adhesive power has weakened, the user removes the most outer surface of the adhesive component 352 by one round to expose a new portion of the weak adhesive layer 354 of the adhesive component 352 as shown in FIG. 9A. Then, the portion, the adhesive power of which has weakened, can be cut along the perforation 356. At the time of cutting, if a portion thereof temporarily peels off as shown in FIG. 9B, the user puts the portion back. Thus, a new portion of the weak adhesive layer 354 is exposed, so that the page-turning operation can be appropriately resumed.

As shown in FIG. 1 to FIG. 3, the blower 5 is disposed upstream from the departure position of the book B. For example, when pages P of the book B is turned from left to right, the blower 5 is disposed on the left side of pages P which is placed at the departure position of the book B. When pages P of the book B is turned from right to left, the blower 5 is disposed on the right side of pages P which is placed at the departure position of the book B. Therefore the blower 5 is disposed outside the angle of view of the camera 22. The blower 5 includes a blower body 52 and a blower base 53 which supports the blower body 52. The blower body 52 includes an air outlet 51 which sends out air.

Figure 10:
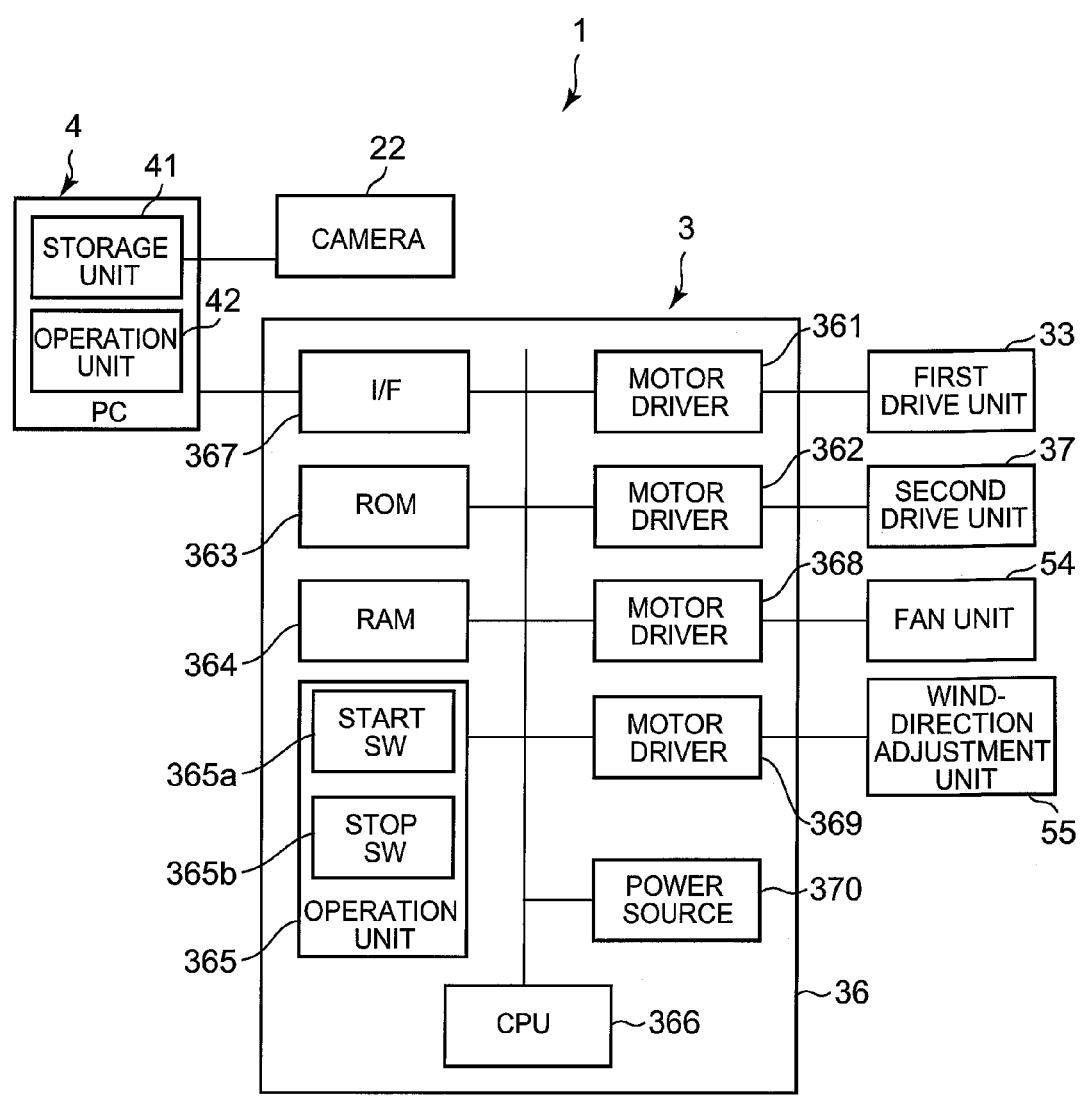
FIG. 10 is a block diagram showing the main control configuration of the document camera system according to the embodiment.

The blower body 52 is provided with a fan unit 54 (see FIG. 10) and a wind-direction control unit 55 (see FIG. 10). The fan unit 54 sends air from the air outlet 51. The wind-direction control unit 55 changes a moving direction of a wind (a wind direction) sent from the fan unit 54. The wind-direction control unit 55 changes the wind direction such that the wind blows upward or downward (the direction of the arrow Y2 in FIG. 3) from the air outlet 51.

The blower base 53 supports the blower body 52 at a predetermined height. This blower base 53 is configured such that the air outlet 51 is disposed higher than pages P at the destination position. Therefore a wind which blows from the air outlet 51 passes above pages P at the departure position and blows against pages P at the destination position. Pages P at the departure position is not much affected by the wind, while pages P at the destination position is much affected by the wind.

Next, the main control configuration of a document camera system 1 according to the embodiment will be explained. FIG. 10 is a block diagram showing the main control configuration of the document camera system 1. As shown in FIG. 10, the control unit 36 of the page-turning device 3 includes: a motor driver 361 which drives the first drive unit 33; a motor driver 362 which drives the second drive unit 37; a motor driver 368 which drives the fan unit 54; a motor driver 369 which drives the wind-direction adjustment unit 55; a ROM 363 where a variety of programs are stored; a RAM 364 where the programs stored in the ROM 363 are opened when the programs are executed; an operation unit 365 where a variety of instructions are inputted; a CPU 366 which controls the motor drivers 361 and 362 by opening and executing the programs, which are stored in the ROM 363, in the RAM 364 on the basis of the instructions from the operation unit 365; an I/F 367 to which the computer 4 is connected; and a power source 370.

The operation unit 365 includes a start switch 365a for starting page-turning processing and a stop switch 365b for stopping the page-turning processing. The CPU 366 counts turned pages as a value N from the time when the start switch 365a is operated to the time when the stop switch 365b is operated. The value N is stored in the RAM 364. Thus the control unit 36 functions as a page-turn-amount detector of the present invention which detects the amount of the pages P turned by the turning unit 30.

The computer 4 includes: a storage unit 41 which stores basic images G (see FIG. 14, etc.) picked up by the camera 22 and trimmed images obtained by cutting out only predetermined areas G1 (see FIG. 21, etc.) from the basic images G; and an operation unit 42 such as a keyboard, a touch panel and a mouse through which various commands are input to the computer 4.

An image-reading method by the document camera system 1 will be explained hereinafter.

Figure 11:
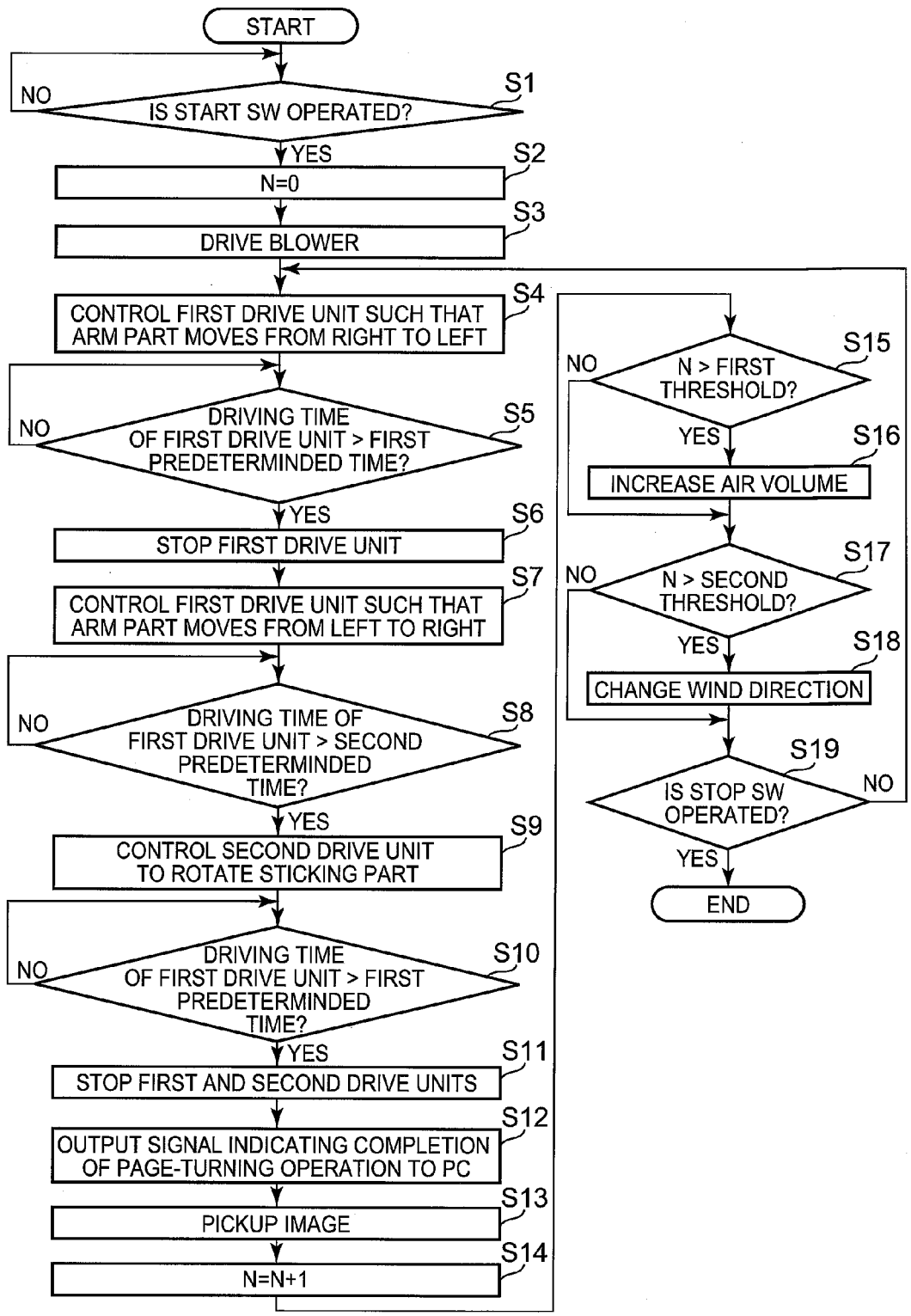
FIG. 11 is a flowchart of page-turning processing by the page-turning device of the embodiment.

First, page-turning processing in the image-reading method will be explained. FIG. 11 is a flowchart of the page-turning processing.

First, preparation before execution of the page-turning processing will be explained. This is an example wherein only left pages P are continually imaged first, and then right pages P are continually imaged.

A user places an opened book B on the support base 6 and positions the camera 22 above the left pages P of the opened book B.

In the page-turning device 3, the position of the arm part 34 is adjusted such that the sticking part 35 is disposed at the starting point (the end point of the homeward movement) in advance. At the time, a user checks the adhesive power of the adhesive component 352. If the adhesive power is weak, the user removes the weak portion to expose a new portion of the adhesive component 352. Then, the user opens the book B such that one page (one double-page spread) P before a page (a double-page spread) P from which the user would like to start image pickup is exposed and moves the sticking part 35 to the end point of the outward movement (the start point of the homeward movement). When the power source of the page-turning device 3 is turned on, the CPU 366 opens in the RAM 364 a program for the page-turning processing stored in the ROM 363 to execute the program.

As shown in FIG. 11, at Step S1, the CPU 366 determines whether or not the start switch 365a is operated. When determining that the start switch 365a is not operated, the CPU 366 keeps the state as it is. When determining that the start switch 365a is operated, the CPU 366 shifts the processing to Step S2.

At Step S2, the CPU 366 resets the value N, which is stored in the RAM 364, at zero.

At Step S3, the CPU 366 drives the fan unit 54 to carry out blowing with the blower 5. At this time, an air volume of the fan unit 54 is set at an initial air volume. In the beginning of turning pages P, a large number of pages P exist at the departure position, so the thickness of pages P as a whole is large. Therefore the wind-direction adjustment unit is controlled such that a wind from the blower 5 blows in a direction slightly upward from a horizontal plane.

At Step S4, the CPU 366 controls the first drive unit 33 such that the arm part 34 moves from right to left (homeward movement).

At Step S5, the CPU 366 determines whether or not a driving time of the first drive unit 33 exceeds a first predetermined time. When determining that the driving time does not exceed the first predetermined time, the CPU 366 keeps driving the first drive unit 33. When determining that the driving time exceeds the first predetermined time, the CPU 366 shifts the processing to Step S6. The first predetermined time is set at a time length enough for the arm part 34 to move from the start point to the end point of the homeward movement.

At Step S6, the CPU 366 stops the first drive unit 33. Thereby, the sticking part 35 sticks to a page P on the left with rotation of the sticking part 35 stopped.

At Step S7, the CPU 366 controls the first drive unit 33 such that the arm part 34 moves from left to right (outward movement).

At Step S8, the CPU 366 determines whether or not a driving time of the first drive unit 33 exceeds a second predetermined time. When determining that the driving time does not exceed the second predetermined time, the CPU 366 keeps driving the first drive unit 33. When determining that the driving time exceeds the second predetermined time, the CPU shifts the processing to Step S9. The second predetermined time is set at a time (time length) shorter than the first predetermined time. In particular, it is preferable that the second predetermined time period is set from a time for the arm part 34 to move from the start point to around the middle point of the outward movement to a time for the arm part 34 to move from the start point to almost the end point of the outward movement.

Figure 12:
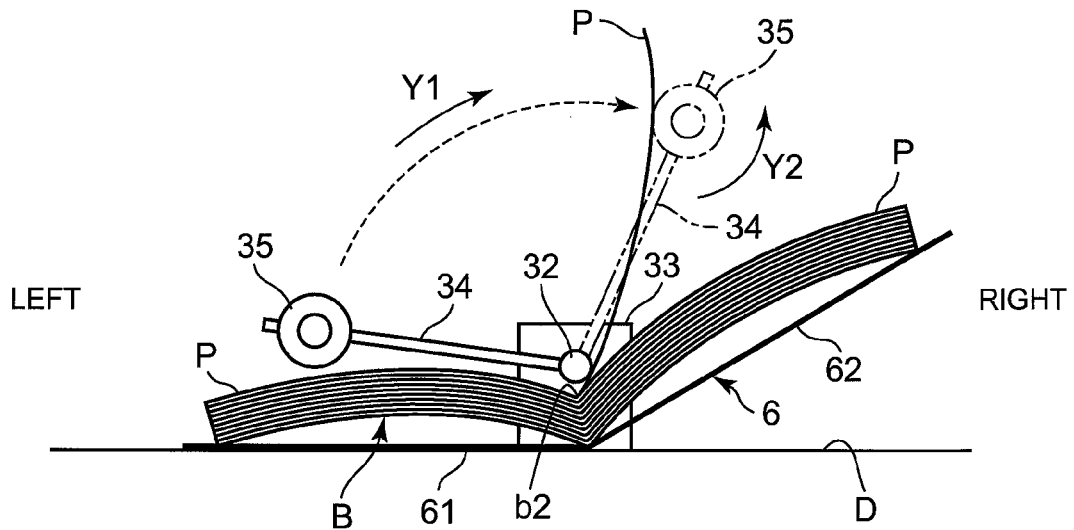
FIG. 12 is an elevation view showing a route and a rotating direction of the sticking part in an outward movement of the arm part according to the embodiment.

At Step S9, the CPU 366 controls the second drive unit 37 to rotate the sticking part 35 while keeping driving the first drive unit 33. This rotation changes the adhesive power of the sticking part 35 when the sticking part 35 separates from a page P, so that the sticking part 35 can reliably separate from the page P. As shown in FIG. 12, the arm part 34 rotates clockwise (arrow Y1) in the outward movement. In order to improve the separation performance, it is preferable that the second drive unit 37 rotate the sticking part 35 in a direction opposite to the swing direction of the arm part 34, i.e. counterclockwise.

At Step S10, the CPU 366 determines whether or not the driving time of the first drive unit 33 exceeds the first predetermined time. When determining that the driving time does not exceed the first predetermined time, the CPU 366 keeps driving the first drive unit 33 and the second drive unit 37. When determining that the driving time exceeds the first predetermined time, the CPU 366 shifts the processing to Step S11.

At Step S11, the CPU 366 stops the first drive unit 33 and the second drive unit 37. The sticking page P is separated from the sticking part 35 while the second drive unit 37 rotates. Thereby, the sticking part 35 is located at a position apart from pages P of the destination position with no page P sticking thereto. The sticking part 35 and the arm part 34 at this position are outside the angle of view of the camera 22. Thus the whole turning unit 30 is outside the angle of view of the camera 22. (See FIG. 2A.)

Figure 13:
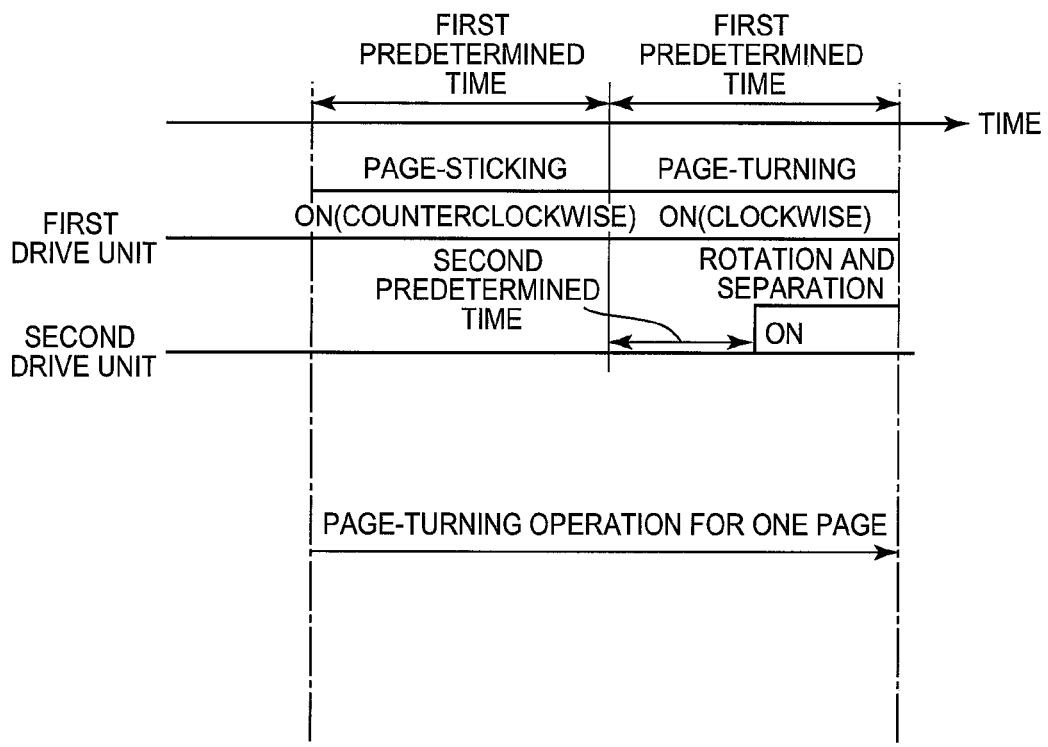
FIG. 13 is a timing chart showing drive timings of the first drive unit and the second drive unit in the page-turning operation for one page according to the embodiment.

FIG. 13 illustrates drive timings of the first drive unit 33 and the second drive unit 37 in the page-turning operation for one page.

In the embodiment, a drive end timing when the second drive unit 37 stops coincides with a drive end timing when the first drive unit 33 stops. However, the drive end timing when the second drive unit 37 stops may be earlier than the drive end timing when the first drive unit 33 stops.

At Step S12, the CPU 366 outputs a signal which indicates completion of the page-turning processing to the computer 4.

At Step S13, the computer 4 controls the camera 22 on the basis of the inputted signal which indicates completion of the page-turning operation so that the pages P opened at present (spread state) are imaged (image pickup). At the time, since the turning unit 30 and the blower 5 are outside the angle of view of the camera 22, only the pages P opened at present are imaged. Picked-up image data generated by the camera 22 are numbered one by one (each imaging) as the basic image G and stored in a storage unit 41 of the computer 4.

At Step S14, the CPU 366 adds one to the value N and stores the result in the RAM 364.

At Step S15, the CPU 366 determines whether or not the value N exceeds a first threshold. When determining that the value N exceeds the first threshold, the CPU 366 shifts the processing to Step S16. When determining that the value N does not exceed the first threshold, the CPU 366 shifts the processing to Step S17. When many pages P are piled up at the destination position, the pages P are likely to return to the departure position. Therefore the first threshold is set at such an amount of turned pages that a wind of the initial air volume can reliably push pages P against the destination position.

At Step S16, the CPU 366 controls the fan unit 54 to make the air volume larger than the initial air volume.

At Step S17, the CPU 366 determines whether or not the value N exceeds a second threshold. When determining that the value N exceeds the second threshold, the CPU 366 shifts the processing to Step S18. When determining that the value N does not exceed the second threshold, the CPU 366 shifts the processing to Step S19. As many pages P are turned, the height of the pages P at the departure position as a whole gets lower, and the lower edge (seam) of the last turned page P at the destination position gets lower. Therefore the second threshold is set at such an amount of turned pages that a wind in the initial wind direction can reliably push pages P against the destination position.

At Step S18, the CPU 366 controls the wind-direction adjustment unit 55 to make the wind direction downward as compared with the initial wind direction.

At Step S19, the CPU 366 determines whether or not the stop switch 365b is operated. When determining that the stop switch 365b is not operated, the CPU 366 shifts the processing to Step S2. When determining that the stop switch 365b is operated, the CPU 366 ends the page-turning processing. In this way, the page-turning operation and the image pickup operation are alternately carried out, and image pickup of the left pages P at the departure position is completed.

After continual imaging of pages P on one side is finished, a user turns the book B upside down and places the book B on the support base 6 such that pages P which are not imaged are positioned on the left support plate 61. Then the above page-turning processing is executed again. In this case, image data of each page P is stored upside down.

Through the above processing, the pages P on the left and right of the book B are continually imaged and stored respectively. After imaging, the storage unit 41 of the computer 4 stores an image data group of the left pages P (the first image data group) and an image data group of the right pages P (the second image data group) separately.

After storing the basic images G, the computer 4 generates trimmed images by cutting out predetermined areas of the basic images G, and stores the trimmed images.

When trimming is executed on the basic images G, the predetermined areas of pages cannot be cut out to be approximately in the same size without correction.

Figure 14:
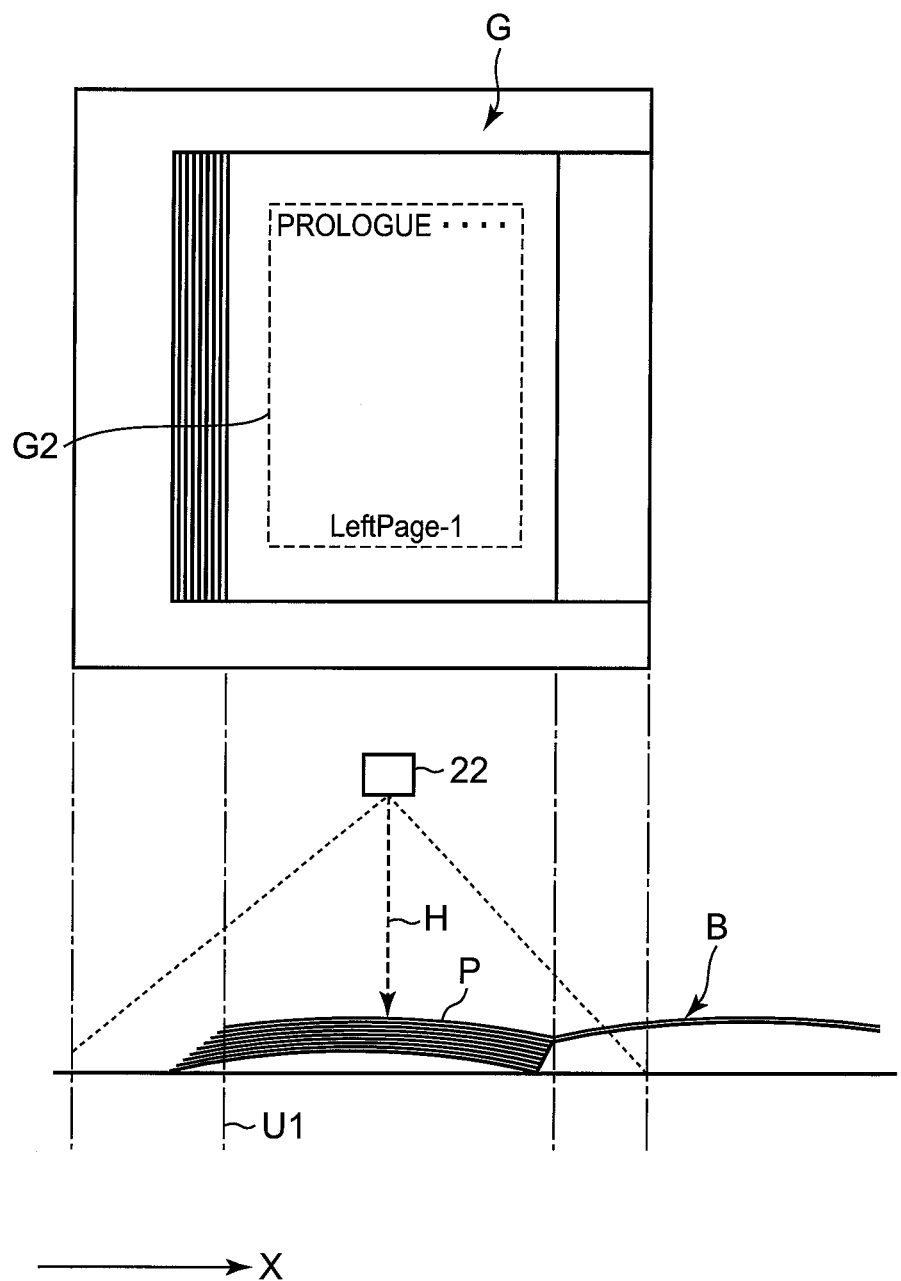
FIG. 14 illustrates a state of a book and a basic image at the beginning of turning pages according to the embodiment.
Figure 15:
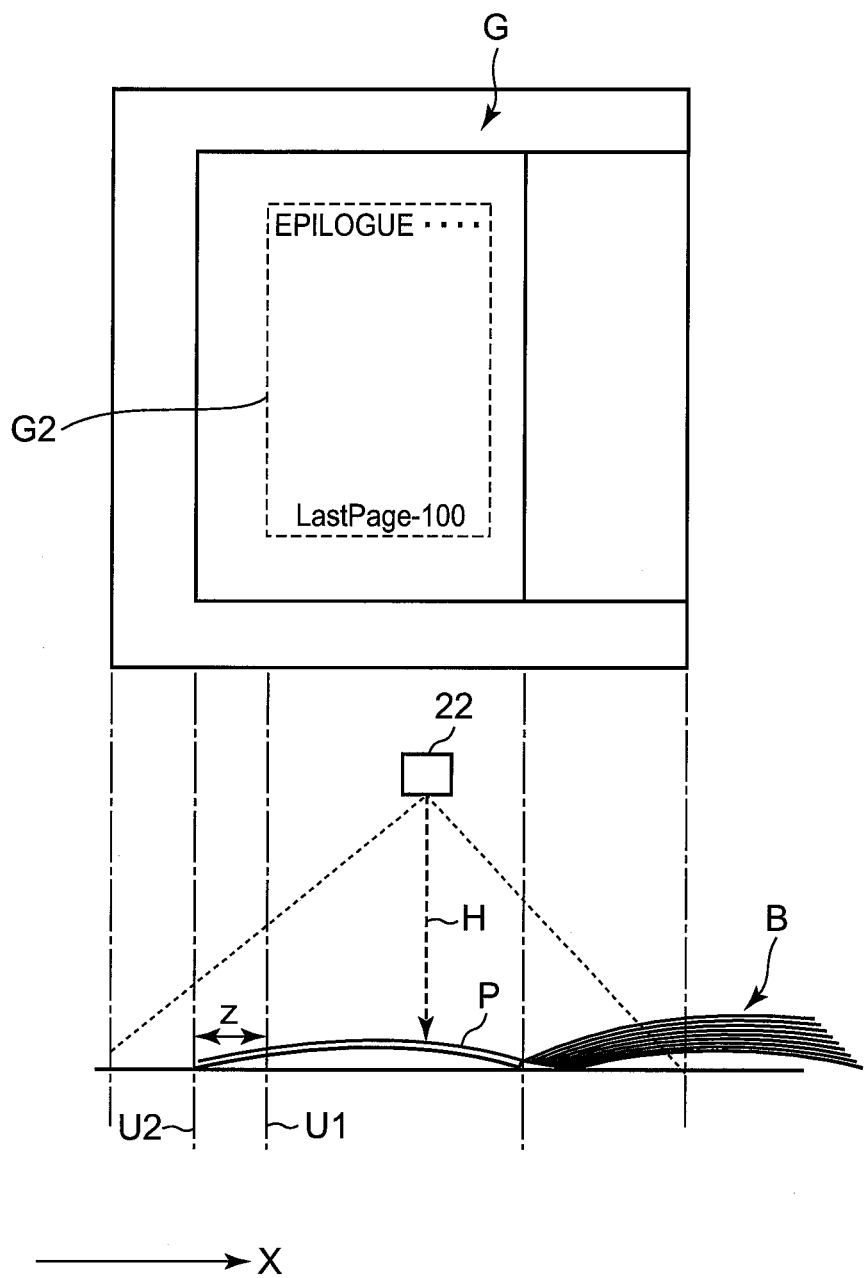
FIG. 15 illustrates a state of the book and a basic image at the end of turning pages according to the embodiment.

FIG. 14 illustrates a state of the book B and the basic image at the beginning of turning pages, while FIG. 15 illustrates a state of the book B and the basic image at the end of turning pages according to the embodiment.

As shown in FIG. 14, at the beginning of turning pages P, the distance H between the camera 22 and the uppermost page P is at the minimum, and therefore a note area G2 is large in relation to the basic image G.

On the other hand, as shown in FIG. 15, at the end of turning pages P, the distance H between the camera 22 and the uppermost page P is at the maximum, and therefore the note area G2 is small in relation to the basic image G.

Further, there is a difference Z between the position U1 of the left end of the uppermost page P at the beginning of turning and the position U2 of the left end of the uppermost page P at the end of turning. Therefore the note area G2 gradually shifts in X direction as pages P are turned. Correction of the difference must be taken into consideration when trimming is executed.

Figure 16:
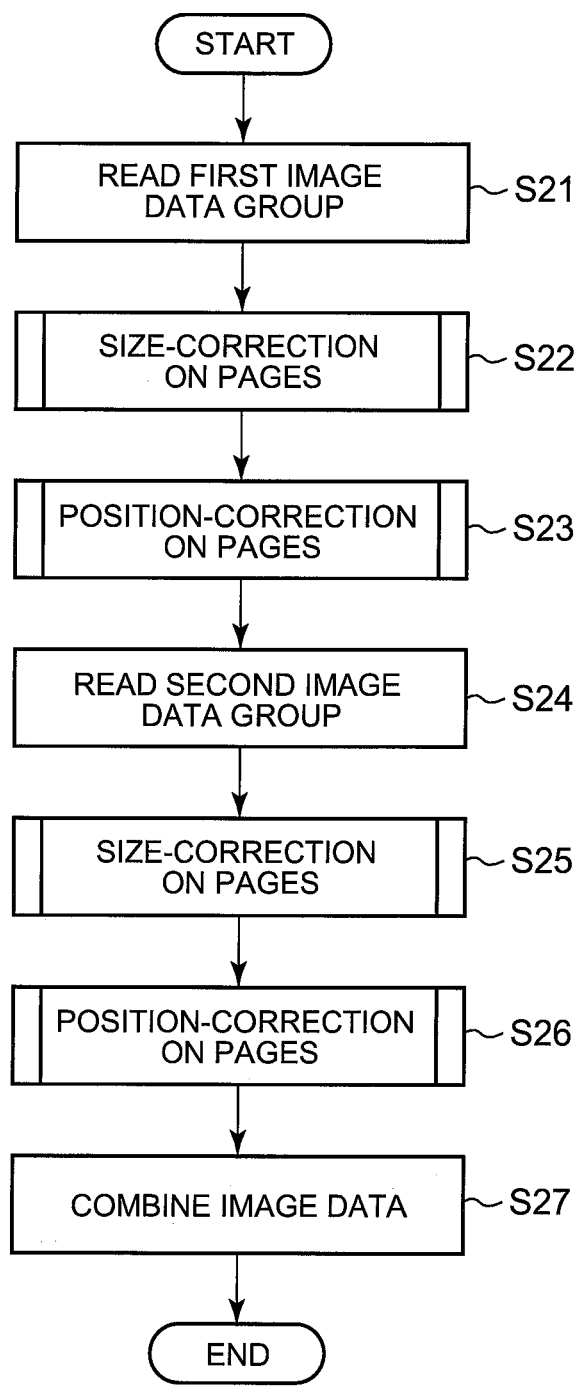
FIG. 16 is a flowchart of trimming processing according to the embodiment.

Trimming processing in the image-reading method according to the embodiment will be explained hereinafter. FIG. 16 is a flowchart of trimming processing.

In the trimming processing, the computer 4 executes a program of cutting out the predetermined areas G1 from the basic images G obtained by imaging pages P and storing the cut images as trimmed images.

When the trimming processing starts, the computer 4 reads the first image data group from the storage unit 41 at Step S21.

At Step S22, the computer 4 executes size-correction of the pages P in the first image data group.

Figure 17:
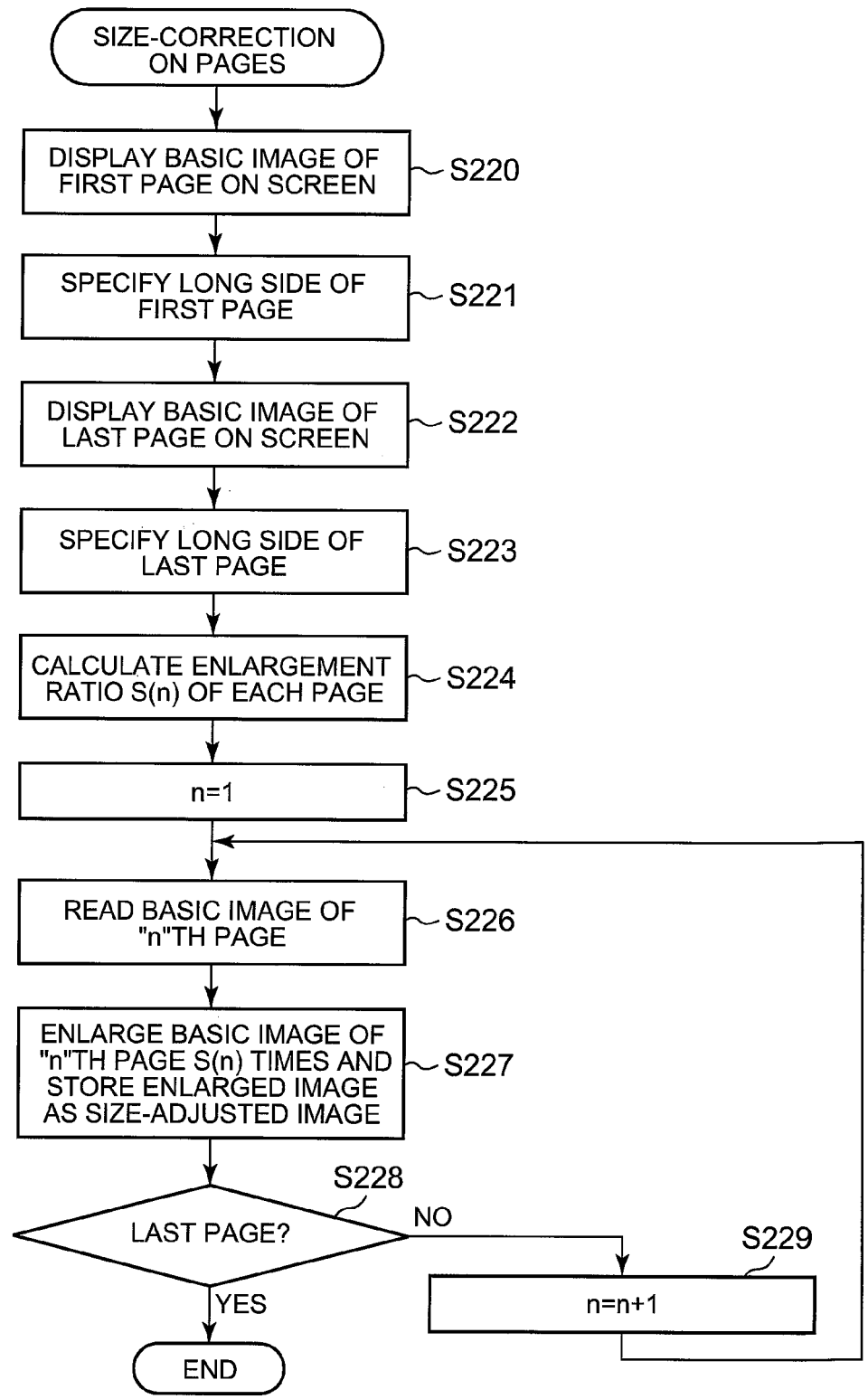
FIG. 17 is a flowchart of size-correction processing on pages according to the embodiment.

FIG. 17 is a flowchart of size-correction processing on pages P.

Figure 18:
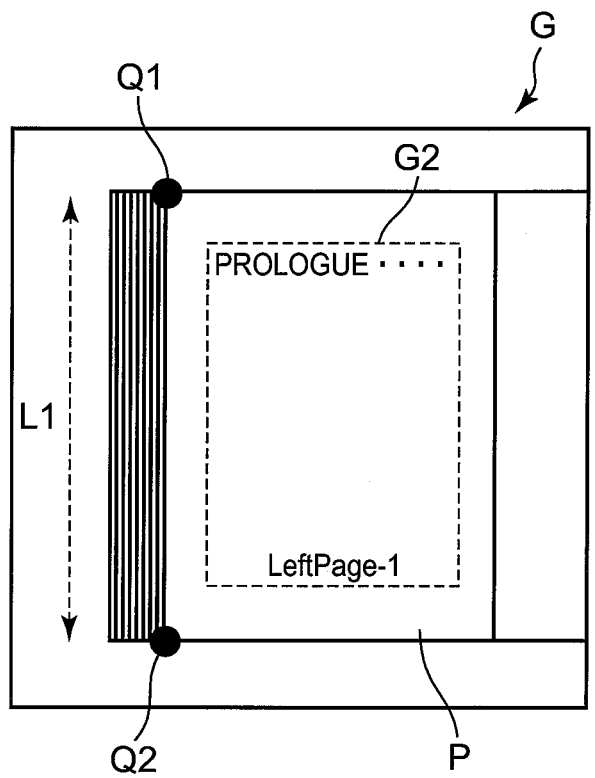
FIG. 18 illustrates a basic image of the first page displayed on a PC screen according to the embodiment.

When the size-correction processing is executed, the computer 4 displays the basic image G of the first page P on the screen as shown in FIG. 18 at Step S220.

At Step S221, a user specifies a start point Q1 and an end point Q2 on one side of the page P (in this embodiment, the long side on the left) of the basic image G displayed on the screen by operating the operation unit 42 (initial-parameter specification step (processing)). When the operation unit 42 is a mouse, a user moves a cursor to the start point Q1 and the end point Q2 and clicks so that the computer 4 identifies coordinates of the points. The computer 4 calculates the length L1 of the long side from the coordinates of the start point Q1 and the end point Q2.

Figure 19:
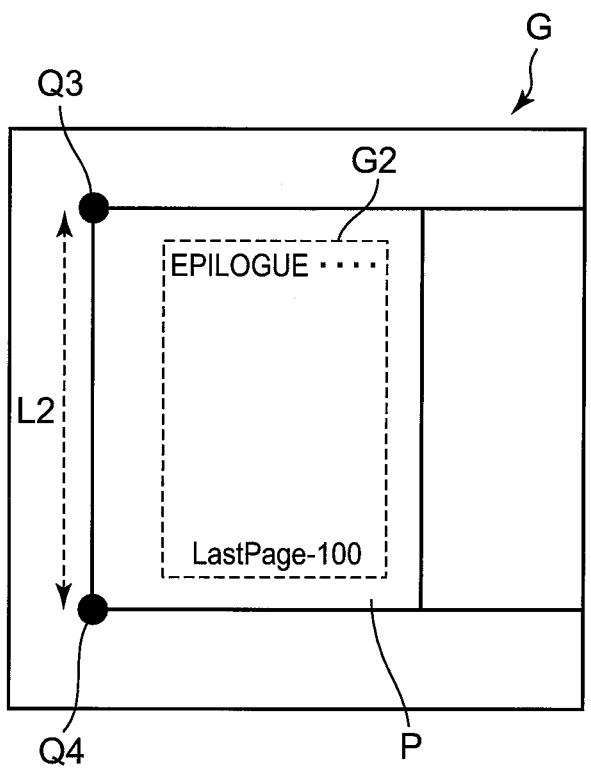
FIG. 19 illustrates a basic image of the last page displayed on a PC screen according to the embodiment.

At Step S222, the computer 4 displays the basic image G of the last page P on the screen as shown in FIG. 19.

At Step S223, a user specifies a start point Q3 and an end point Q4 on the basic image G displayed on the screen by operating the operation unit 42 so that the computer 4 specifies coordinates of the points (final-parameter specification step (processing)). The computer 4 calculates the length L2 of the long side from the coordinates of the start point Q3 and the end point Q4.

At Step S224, the computer 4 calculates an enlargement ratio S(n) of each page P by the formula below so as to determine an enlargement ratio S(n) of a certain page P. Specifically, the computer 4 determines the enlargement ratio S(n) of each page P between the beginning of turning pages P and the end of turning pages P by interpolation (determination step (processing)).

The enlargement ratio S of the last page P in relation to the first page P is calculated by the formula below.

$$S=L1/L2$$

The enlargement ratio S(n) of a certain page n (the number of a page) is calculated by the formula below, wherein m is the number of pages from the first page P to the last page P.

$$S(n)=1+(S-1)\cdot\{(n-1)/(m-1)\}$$

Thus linear interpolation is used as an interpolation method in the size-correction processing on pages P according to the embodiment. However, other known interpolation methods can be used.

At Step S225, the computer 4 sets "n=1".

At Step S226, the computer 4 reads an "n"$^{th}$ basic image G.

Figure 21:
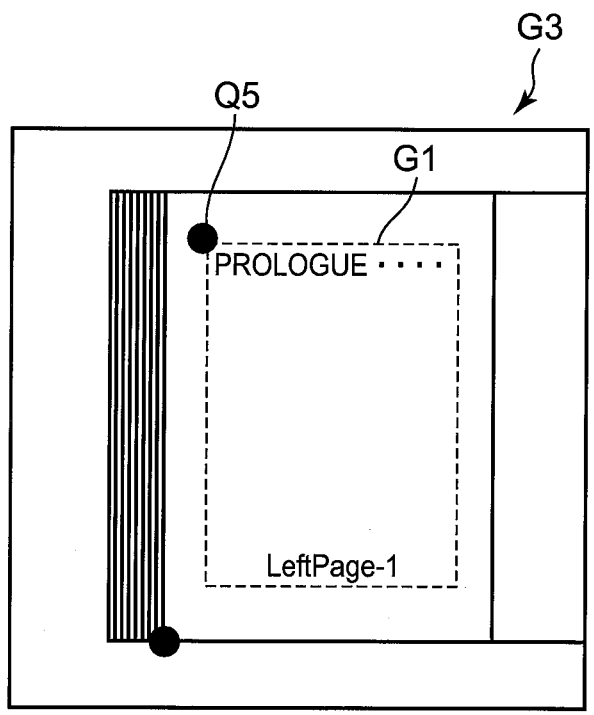
FIG. 21 illustrates a size-adjusted image of the first page displayed on a PC screen according to the embodiment.

At Step S227, the computer 4 enlarges S(n) times the read "n"$^{th}$ basic image G and stores the enlarged image in the storage unit 41 as a size-adjusted image G3 (see FIG. 21, etc.). The image of each page P is corrected on the basis of the enlargement ratio S(n) of the page P, which is determined at Step S224 (correction step (processing)).

At Step S228, the computer 4 determines whether or not the read "n"$^{th}$ page is the last page P. When determining that the read "n"$^{th}$ page P is not the last page P, the computer 4 shifts the processing to Step S229.

At Step S229, the computer 4 sets "n=n+1" and shifts the processing to Step S226.

Step S226 to Step S229 are repeated until the last page P so that the basic images G of the all pages P are converted into images having the same size.

At Step S228, when determining that the read "n"$^{th}$ page P is the last page P, the computer 4 ends the size-correction processing on pages P and shifts the processing to Step S23 in FIG. 16.

At Step S23, the computer 4 executes position-correction processing on the pages P in the first image data group.

Figure 20:
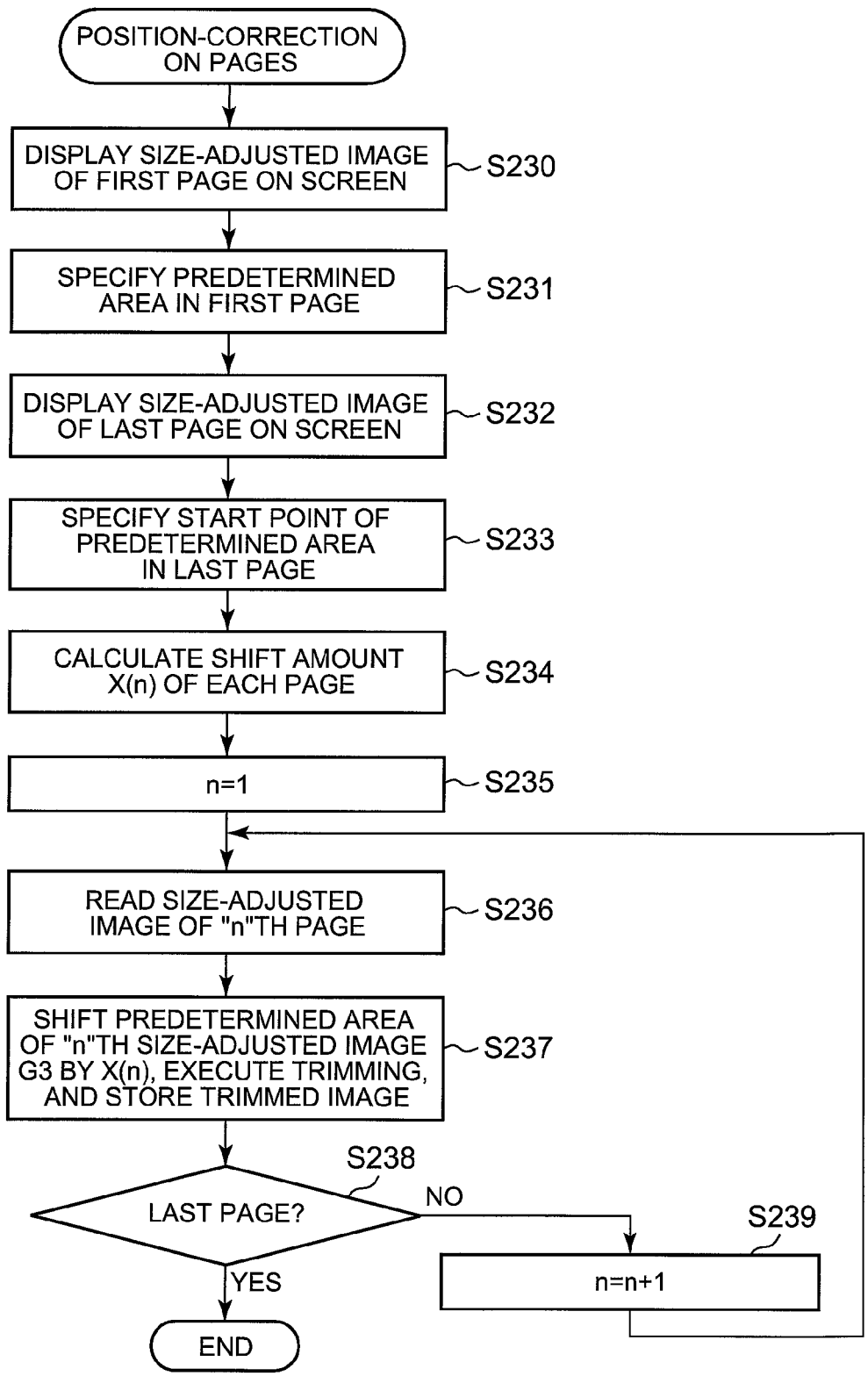
FIG. 20 is a flowchart of position-correction processing on pages according to the embodiment.

FIG. 20 is a flowchart of the position-correction processing on pages P.

When the position-correction processing on pages P is started, the computer 4 displays the size-adjusted image G3 of the first page P on the screen as shown in FIG. 21 at Step S230.

At Step S231, a user specifies a predetermined area G1 in the size-adjusted image G3 displayed on the screen by operating the operation unit 42 (initial-parameter specification step (processing)). When the operation unit 42 is a mouse, a user drags a cursor from a start point Q5 and drops the cursor after the designated predetermined area G1 is specified so that the computer 4 identifies coordinates of the predetermined area G1. A user can specify the predetermined area G1 in any way. However, it is preferable to specify the predetermined area G1 to include at least the note area G2.

Figure 22:
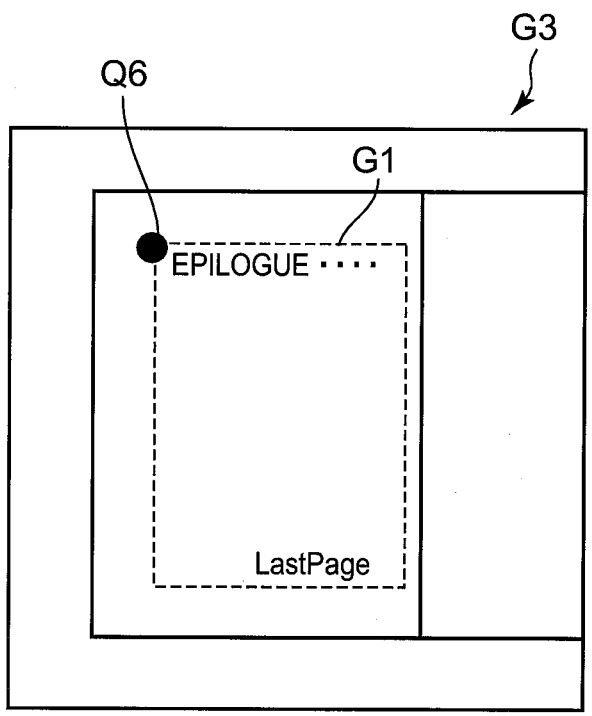
FIG. 22 illustrates a size-adjusted image of the last page displayed on a PC screen according to the embodiment.

At Step S232, the computer 4 displays the size-adjusted image G3 of the last page P on the screen as shown in FIG. 22.

At Step S233, a user specifies a start point Q6 of the predetermined area G1 in the size-adjusted image G3 displayed on the screen by operating the operation unit 42. Then the computer 4 identifies coordinates of the start point Q6 (final-parameter specification step (processing)).

At Step S234, the computer 4 calculates a shift amount X(n) of each page P by the formula below so as to determine a shift amount X(n) of a certain page P. Specifically, the computer 4 determines the shift amount X(n) of each page P between the beginning of turning pages P and the end of turning pages P by interpolation (determination step (processing)).

The shift amount ΔX of the last page P in relation to the first page P is calculated by the formula below, wherein Xs is an X coordinate of the start point Q5 on the first page P and Xe is an X coordinate of the start point Q6 on the last page P.

$$\Delta X=Xs-Xe$$

A shift amount X(n) of a certain page n (the number of a page) is calculated by the formula below.

$$X(n)=Xs-\Delta X\cdot\{(n-1)/(m-1)\}$$

Thus linear interpolation is used as an interpolation method in the position-correction processing on pages P according to the embodiment. However, other known interpolation methods can be used.

At Step S235, the computer 4 sets "n=1".

At Step S236, the computer 4 reads an "n"$^{th}$ size-adjusted image G3.

At Step S237, the computer 4 shifts the predetermined area G1 in the read "n"$^{th}$ size-adjusted image G3 by X(n), executes trimming, and stores the trimmed image in the storage unit 41. The image of each page P is corrected on the basis of shift amount X(n) of the page P, which is determined at Step S234 (correction step (processing)).

At Step S238, the computer 4 determines whether or not the read "n"$^{th}$ page is the last page P. When determining that the read "n"$^{th}$ page P is not the last page P, the computer 4 shifts the processing to Step S239.

At Step S239, the computer 4 sets "n=n+1" and shifts the processing to Step S236.

Step S236 to Step S239 are repeated until the last page P so that position-correction of the predetermined areas G1 of the all pages P is completed.

At Step S238, when determining that the read "n"$^{th}$ page P is the last page P, the computer 4 ends the position-correction processing on pages P and shifts the processing to Step S24 in FIG. 16.

In the position-correction processing on pages P according to the embodiment, position-correction in only the width direction of the book B (X direction) is executed. However, it goes without saying that position-correction in the longitudinal direction can also be executed.

At Step S24, the computer 4 reads the second image data group from the storage unit 41.

At Step S25, the computer 4 executes size-correction on the pages P in the second image data group. As for specific processing, processing executed here is same as the size-correction processing on the pages P in the first image data group. Therefore further explanation is omitted here.

At Step S26, the computer 4 executes position-correction on the pages P in the second image data group. As for specific processing, processing executed here is same as the position-correction processing on the pages P in the first image data group. Therefore further explanation is omitted here.

At Step S27, the computer 4 combines the trimmed images based on the first image data group and the trimmed images based on the second image data group into one data, while reconstructing the data such that all the trimmed images line up in order, and completes the processing.

Thus, in the position-correction processing on pages P, positions of the predetermined areas G1 are adjusted using the size-adjusted images of pages P, and trimming is executed so that the predetermined areas G1 are cut out. The size-adjusted images of pages P are made to be a fixed size by enlarging the basic images in predetermined enlargement ratios S(n). Therefore, once the predetermined area G1 is set on the basis of the size-adjusted image of the first page P which is not enlarged, the predetermined areas G1 of the most appropriate sizes are set for the pages P after the first page P.

Thus the enlargement ratio S(n) is a parameter related to the predetermined area G1 according to the present invention. The length L1, which is used for calculating the enlargement ratio S(n), is a parameter related to the predetermined area G1 at the beginning of turning pages P. The length L2 is a parameter related to the predetermined area G1 at the end of turning pages P.

The shift amount X(n) is a parameter related to the predetermined area G1 according to the present invention. The X coordinate of the start point Q5 on the predetermined area G1 in the first page P, which is used for calculating the shift amount X(n), is a parameter related to the predetermined area G1 at the beginning of turning pages P. The X coordinate of the start point Q6 on the predetermined area G1 in the last page P is a parameter related to the predetermined area G1 at the end of turning pages P.

Since the computer 4 specifies and interpolates these parameters, the computer 4 functions as an initial-parameter specification unit, a final-parameter specification unit, a determination unit and a correction unit.

As described above, according to the embodiment, only the parameter at the beginning of turning pages P and the parameter at the end of turning pages P among parameters related to the predetermined areas G1 for cutting out trimmed images are specified in advance. The parameters for each page P between the page P at the beginning of turning the pages P and the page P at the end of turning the pages P are interpolated on the basis of the specified parameters. According to the embodiment, the predetermined areas G1 are adjusted on the basis of the interpolated parameters for each page P. The trimmed images of the all pages P can be uniform. Therefore, according to the embodiment, uniformity of the trimmed images is secured from the first page to the last page of a book.

Since an interpolation technique is used in the above correction processing, the time required for data processing is quite shorter as compared with the case where recognition of image and correction processing are executed on every single page P.

Further, according to the embodiment, since linear interpolation is used as an interpolation method, the parameters for pages P are interpolated by a simple calculation. Therefore, according to the embodiment, interpolation processing of the computer 4 is simplified. When accuracy is required, the computer 4 can use an advanced interpolation method.

According to the embodiment, since the parameters are specified on the basis of commands input by a user through the operation unit 42, the predetermined areas G1 are determined following a user's wishes.

According to the embodiment, since the parameter is related to the size of each predetermined area G1, the size of the predetermined area G1 of each page P can be calculated using interpolation.

According to the embodiment, since the parameter is related to the position of each predetermined area G1, the position of the predetermined area G1 of each page P can be calculated using interpolation.

The invention is not limited to the above embodiment, and several modifications can be applied thereto appropriately.

In the above embodiment, the sticking part 35 has the adhesive component 352, and the sticking part 35 sticks to a page P by the adhesive power of the adhesive component 352. However, it is also possible that the sticking part 35 sticks to a page P by suction etc. In this case, for example, a communicating hole which communicates with an inner space of the sticking part 35 is formed on the circumference surface of the sticking part 35 so that the inner space of the sticking part 35 and a pump communicate with each other, and by driving the pump such that the inner space is under negative pressure, sucking power acts onto the communicating hole. Thereby, the sticking part 35 can stick to a page P by the suction power.

Other than suction and adhesion, sticking by electrostatic attraction can be applied to the sticking part 35.

In the above embodiment, an example case where a user operates the operation unit 42 to specify the predetermined areas G1 is shown. Instead of the above example, it is also possible that the computer 4 executes a known image processing on each of the basic images of the first page P and the last page P to extract a border between the note area G2 and a margin and identifies the predetermined area G1 from the extracted result. The computer 4 specifies a parameter at the beginning of turning pages P on the basis of the predetermined area G1 which is an identified area in the basic image G of the first page P. On the other hand, the computer 4 specifies a parameter at the end of turning pages P on the basis of the predetermined area G1 which is an identified area in the basic image G of the last page P. Thus the parameters can be specified automatically.

When the parameters are specified automatically, the specified result could be the one which does not satisfy a user. Therefore, after identification of the predetermined areas G1 through image processing is executed, the computer 4 displays the predetermined areas G1 on a screen to ask a user whether the predetermined areas G1 are appropriate or not. A user input a response by operating the operation unit 42. When the user's response, which is input through the operation unit 42, is "appropriate", the computer 4 specifies the parameters on the basis of the predetermined areas G1 identified through image processing. On the other hand, when the user's response, which is input through the operation unit 42, is "not appropriate", the computer 4 adjusts the predetermined areas G1 identified through image processing and specifies the parameters on the basis of the adjusted predetermined areas G1. Thus the computer 4 functions as an inquiry unit of the present invention.

One example of a method for adjusting the predetermined areas G1 is to identify the predetermined areas G1 again after an image processing in another condition. Another example thereof is to make fine adjustments to the predetermined areas G1 on the screen by a user's operation on the operation unit 42.

In this example, a user indirectly determines whether the parameters are appropriate or not by determining whether the images of the predetermined areas G1 are appropriate or not. However, it is also possible that the computer 4 displays the parameters which are specified automatically on a screen so that a user can directly determine whether the parameters are appropriate or not.

In the above embodiment, image processing of modifying sizes of pages P and image processing of correcting positions of pages P are separately executed, but these can be executed at the same time.

In the above embodiment, pages P on only one side of the book B are imaged at Step S13, the first image data group is obtained, the book B is re-positioned, the second image data group is obtained by imaging pages P on the other side, both of the data groups are trimmed, and the data is reconstructed such that the pages P line up in order. Instead of the above embodiment, it is also possible to image the pages on the both sides of an opened book at once and execute appropriate image processing on odd pages and even pages.

It is preferable that similar interpolation is executed on focus of the camera 22. Specifically, before imaging pages P, the camera 22 is focused on the note area G2 of the page P at the beginning of turning. Thereby, a subject-distance h1 between the camera 22 and the page P at the beginning of turning is measured. The computer 4 stores the subject-distance h1 in the storage unit 41.

Then a user turns pages P until the last page P by hand, and focuses the camera 22 on the note area G2 of the page P at the end of turning. Thereby a subject-distance h2 between the camera 22 and the page P at the end of turning is measured. The computer 4 stores the subject-distance h2 in the storage unit 41.

Then the computer 4 calculates subject-distances H(n) to each page P according to the formula below to interpolate the subject-distances H(n) to each page P between the beginning of turning pages P and the end of turning pages P.

$$H(n)=h1+(n-1)\cdot\{(h2-h1)/(m-1)\}$$

Every time a page P is turned, the computer 4 calculates the subject-distance H(n) to the page P and sends the subject-distance H(n) to the camera 22. The camera 22 focuses on each page P to be imaged on the basis of the received subject-distance H(n).

Thus interpolation of the subject-distance H(n) to each page P is executed for focus of the camera 22, the camera 22 precisely focuses on all the pages P.

The computer 4 functions as an initial-subject-distance specification unit, a final-subject-distance specification unit and a subject-distance interpolation unit.

In the above embodiment, the enlargement ratio S(n) and the shift amount X(n) are illustrated as examples. However, the computer 4 can interpolate other parameters in the above manner.

Figure 23:
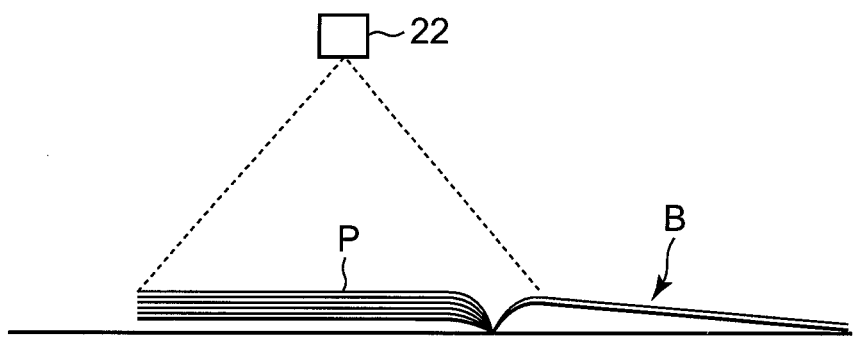
FIG. 23 illustrates a state of the book at the beginning of turning pages according to the embodiment.
Figure 24:
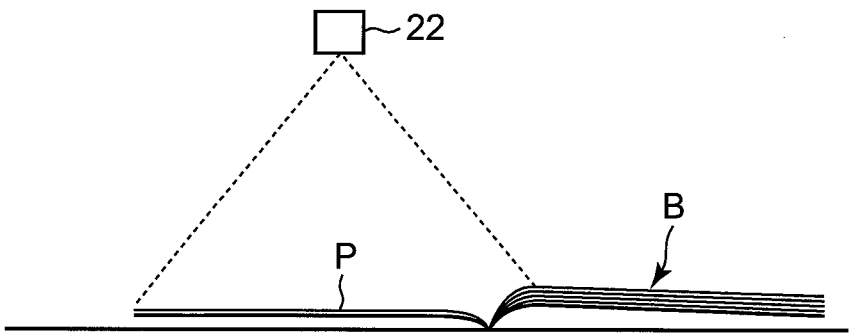
FIG. 24 illustrates a state of the book at the end of turning pages according to the embodiment.
Figure 25:
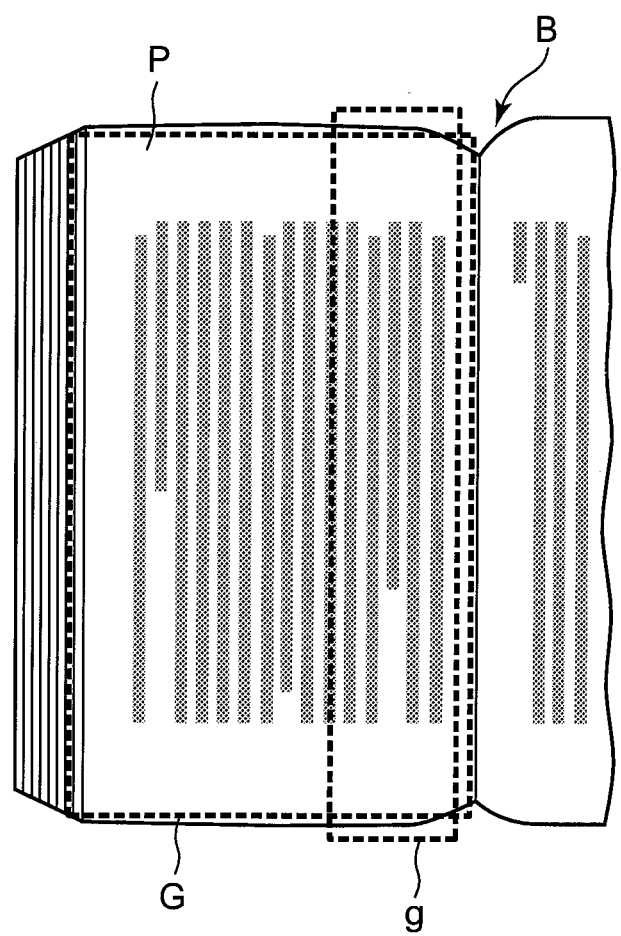
FIG. 25 illustrates a basic image at the beginning of turning pages according to the embodiment.
Figure 26:
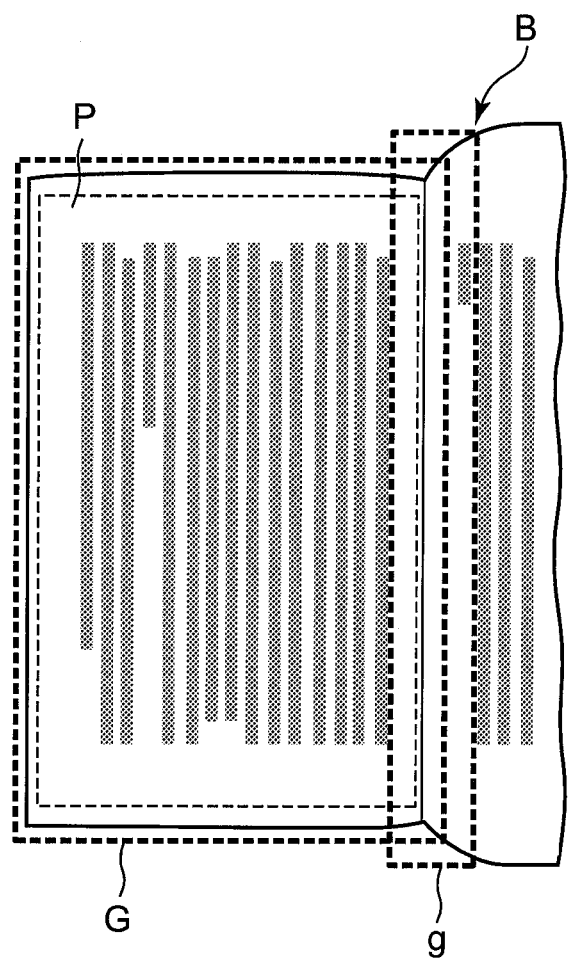
FIG. 26 illustrates a basic image at the end of turning pages according to the embodiment.

FIG. 23 illustrates a state of a book at the beginning of turning pages P. FIG. 24 illustrates a state of the book at the end of turning pages P. FIG. 25 illustrates a basic image G at the beginning of turning pages P. FIG. 26 illustrates a basic image G at the end of turning pages P.

As shown in FIG. 23 and FIG. 24, a bend degree around a seam of a page P is high at the beginning of turning and low at the end of turning.

Therefore, as shown in FIG. 25 and FIG. 26, a part g which is noticeably deformed due to bend in the basic image G at the beginning of turning is wide, while a part g which is noticeably deformed due to bend in the basic image G at the end of turning is narrow.

Accordingly, even if trimming is executed on the basic image G, deformation due to bend gives readers a bad impression. A case where the parameter is related to a bend degree of the predetermined area will be explained in detail hereinafter. This parameter is used for the purpose of correcting deformation due to bend.

Bend-correction processing is executed separately on an image data group of left pages P (the first image data group) and on an image data group of right pages P (the second image data group).

In the example case hereinafter, the bend-correction processing is executed on the first image data group. In this example case, the bend-correction processing is executed after the position-correction processing on pages P.

Figure 27:
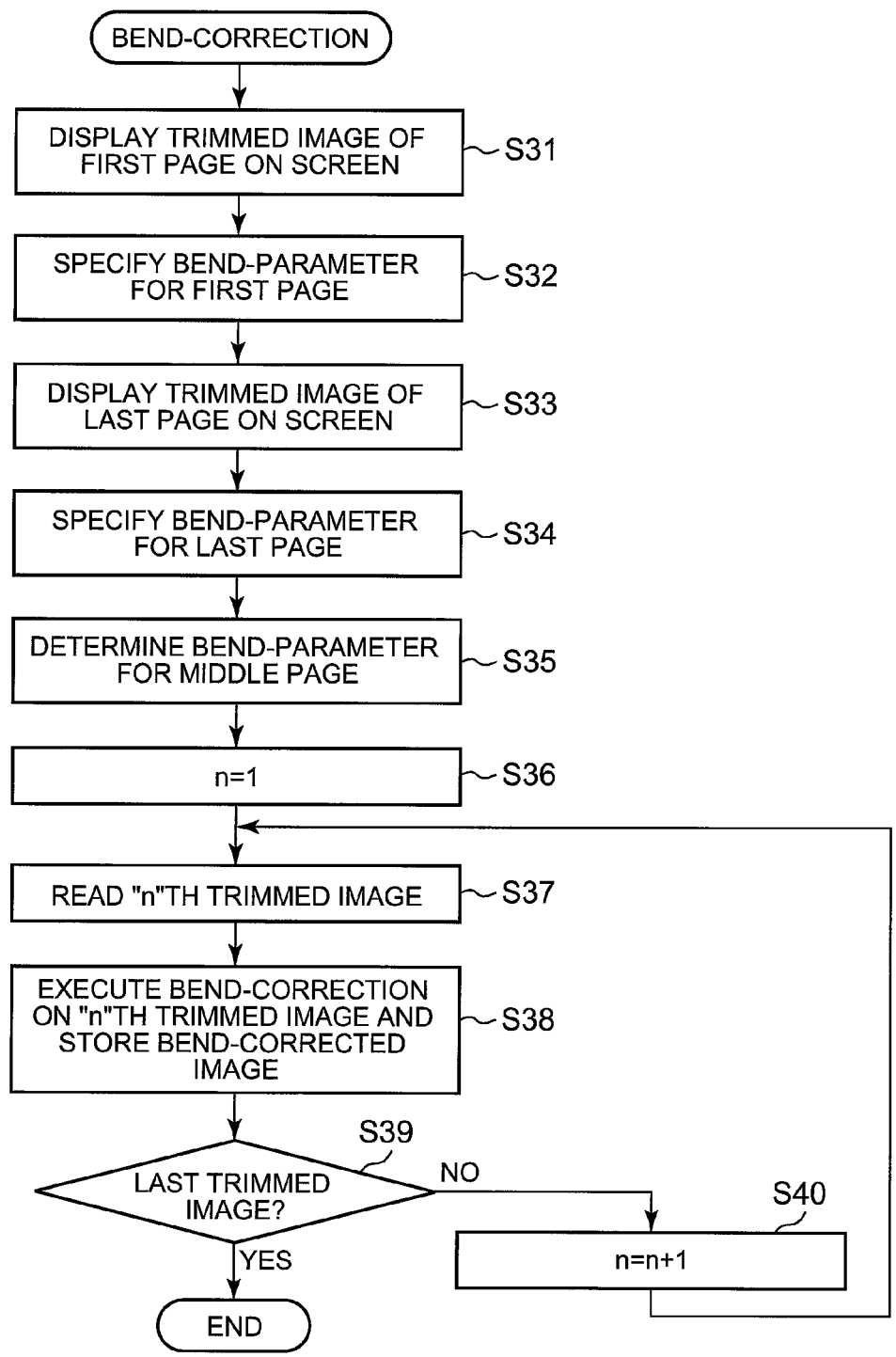
FIG. 27 is a flowchart of bend-correction processing on pages according to the embodiment.

FIG. 27 is a flowchart of bend-correction processing on pages P.

Figure 28:
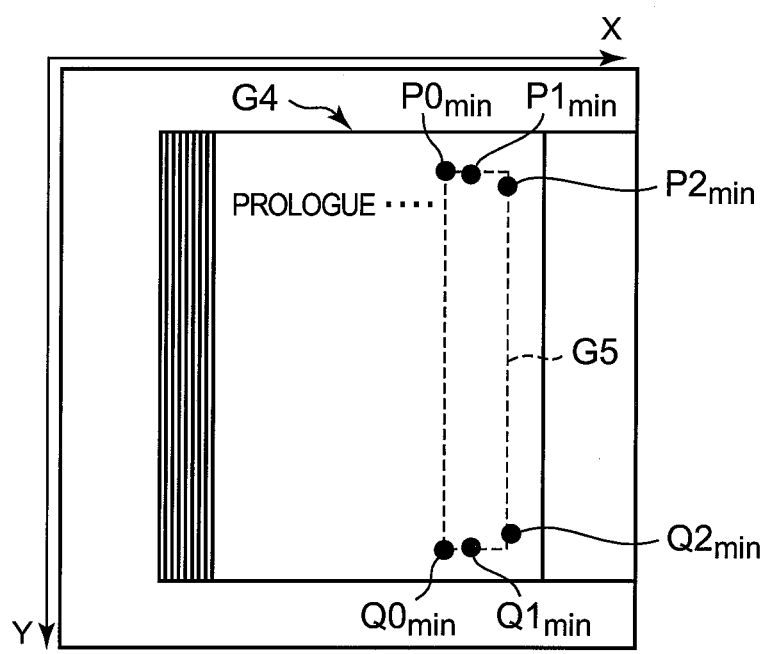
FIG. 28 illustrates a trimmed image of the first page displayed on a PC screen according to the embodiment.

When the bend-correction processing is started, the computer 4 displays the trimmed image G4 of the first page P on the screen as shown in FIG. 28 at Step S31.

At Step S32, bend-parameters for the first page P is specified. Specifically, the trimmed image G4 displayed on the screen has a deformed area G5 wherein text lines are deformed due to bend.

Figure 29:
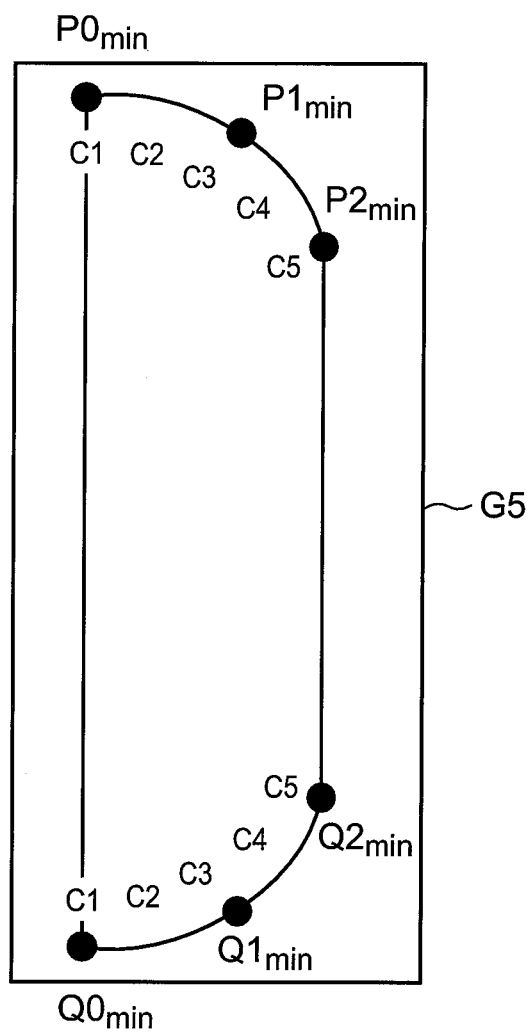
FIG. 29 schematically illustrates deformation of text lines in a deformed area according to the embodiment.

FIG. 29 schematically illustrates the deformation of the text lines in the deformed area G5. In FIG. 29, the text lines on only the uppermost line and the lowest line are shown for convenience. As shown in FIG. 29, when a user operates the operation unit 42, the computer 4 specifies three control points P0min, P1min and P2min for a spline curve on the uppermost text line, and also specifies three control points Q0min, Q1min and Q2min for a spline curve on the lowest text line. The control points P0min, P1min, P2min, Q0min, Q1min and Q2min are the bend-parameters. When the bend-parameters are specified, spline curves along the deformation of the text lines are generated.

In this embodiment, the specification of the control points P0min, P1min, P2min, Q0min, Q1min and Q2min are executed by a user's operation on the operation unit 42. Instead of the above embodiment, it is also possible that the specification of the control points P0min, P1min, P2min, Q0min, Q1min and Q2min are automatically executed using a character reader such as an OCR.

Figure 30:
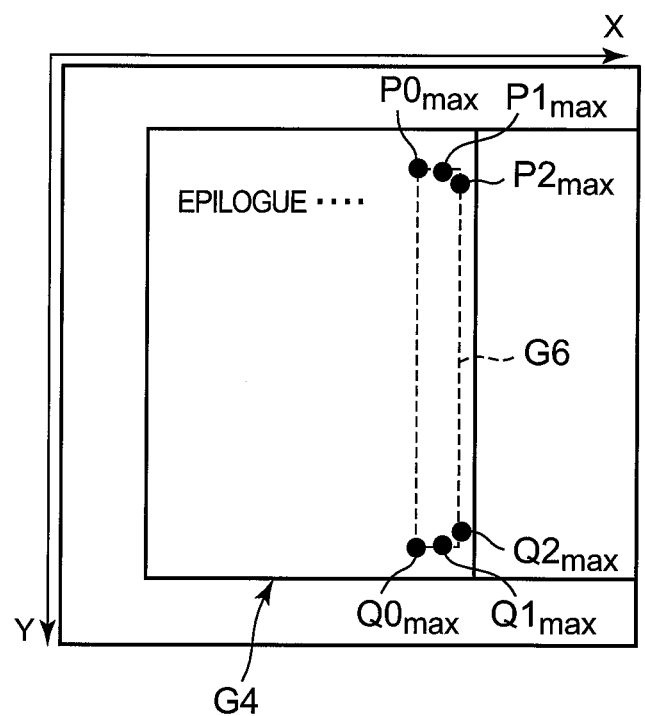
FIG. 30 illustrates a trimmed image of the last page displayed on a PC screen according to the embodiment.

At Step S33, the computer 4 displays a trimmed image G4 of the last page P shown in FIG. 30 on the screen.

At Step S34, the bend-parameter for the last page P is specified in the same manner as Step S32. In this case, the trimmed image G4 of the last page P displayed on the screen has a deformed area G6 wherein text lines are deformed due to bend. The deformed area G6 is smaller than the deformed area G5 since the bend degree of the last page P is lower than the first page P. The control points P0max, P1max and P2max on the uppermost line and the control points Q0max, Q1max and Q2max on the lowest line are specified on the basis of the text lines in the deformed area G6.

At Step S35, the computer 4 determines the bend-parameters for each page P between the first page P and the last page P.

Specifically, first of all, the computer 4 calculates shift amounts of the control points for the first page P to the last page P.

$$\Delta P0 = P0\text{min} - P0\text{max}$$

$$\Delta P1 = P1\text{min} - P1\text{max}$$

$$\Delta P2 = P2\text{min} - P2\text{max}$$

$$\Delta Q0 = Q0\text{min} - Q0\text{max}$$

$$\Delta Q1 = Q1\text{min} - Q1\text{max}$$

$$\Delta Q2 = Q2\text{min} - Q2\text{max}$$

After calculating the shift amounts of the control points, the computer 4 calculates the bend-parameter of each page P on the basis of m which is the number of pages from the first page P to the last page P.

$$P0n = P0\text{min} - \Delta P0 \cdot \{(n-1)/(m-1)\}$$

$$P1n = P1\text{min} - \Delta P1 \cdot \{(n-1)/(m-1)\}$$

$$P2n = P2\min - \Delta P2 \cdot \{(n-1)/(m-1)\}$$

$$Q0n = Q0\min - \Delta Q0 \cdot \{(n-1)/(m-1)\}$$

$$Q1n = Q1\min - \Delta Q1 \cdot \{(n-1)/(m-1)\}$$

$$Q2n = Q2\min - \Delta Q2 \cdot \{(n-1)/(m-1)\}$$

At Step S36, the computer 4 sets "n=1".

At Step S37, the computer 4 reads an "$n^{th}$" trimmed image G4.

At Step S38, the computer 4 executes bend-correction on the read "$11^{th}$" trimmed image G4 and stores the bend-corrected image in the storage unit 41.

Bend-correction on the trimmed images G4 will be explained hereinafter.

Figure 31:
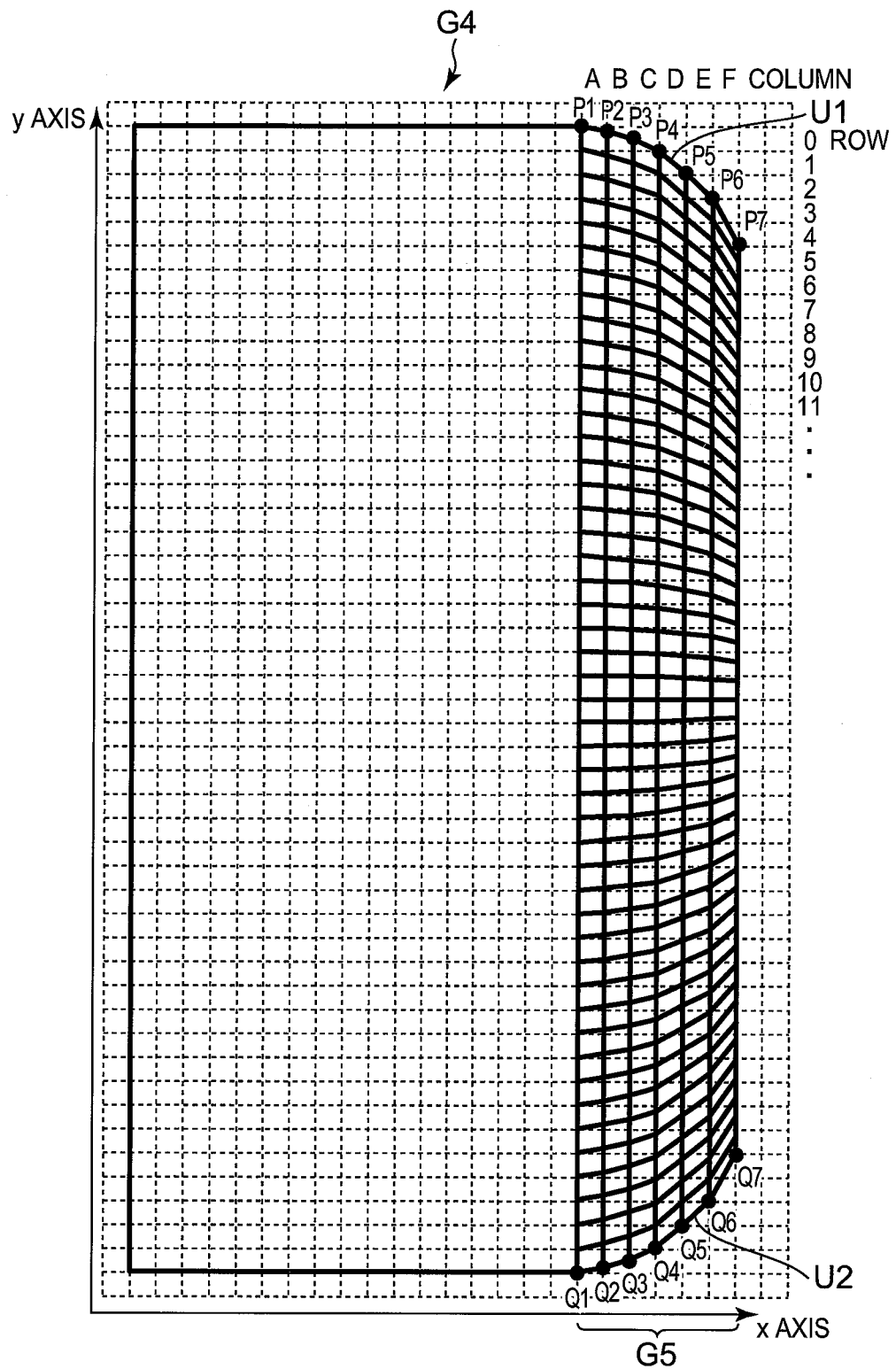
FIG. 31 illustrates a trimmed image before bend-correction according to the embodiment in a state of being divided in a mesh shape.

FIG. 31 illustrates a trimmed image G4 before bend-correction in a state of being divided in a mesh shape. As shown in FIG. 31, the computer 4 executes the bend-correction only on the deformed area G5 in the trimmed image G4. The computer 4 generates an upper spline curve U1 and a lower spline curve U2 on the basis of the control points in the deformed area G5. Then, the computer 4 divides the deformed area G5 in a mesh shape at regular intervals in both the X and Y directions on the basis of the spline curves U1, U2. In this embodiment, the deformed area G5 is divided such that each spline curve is divided into six sections having the same width in the X direction.

The size of one block is the size of each of pieces into which the trimmed image G4 is divided, for example, 256 dots per side.

Figure 32:
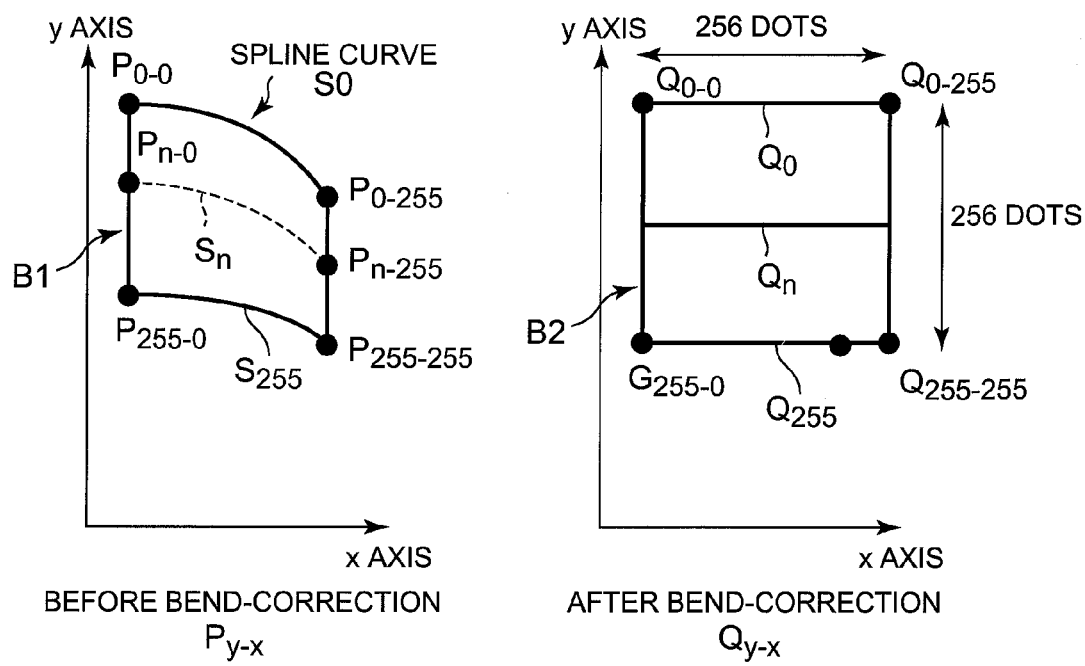
FIG. 32 illustrates a pre-correction block and a post-correction block according to the embodiment.
Figure 33:
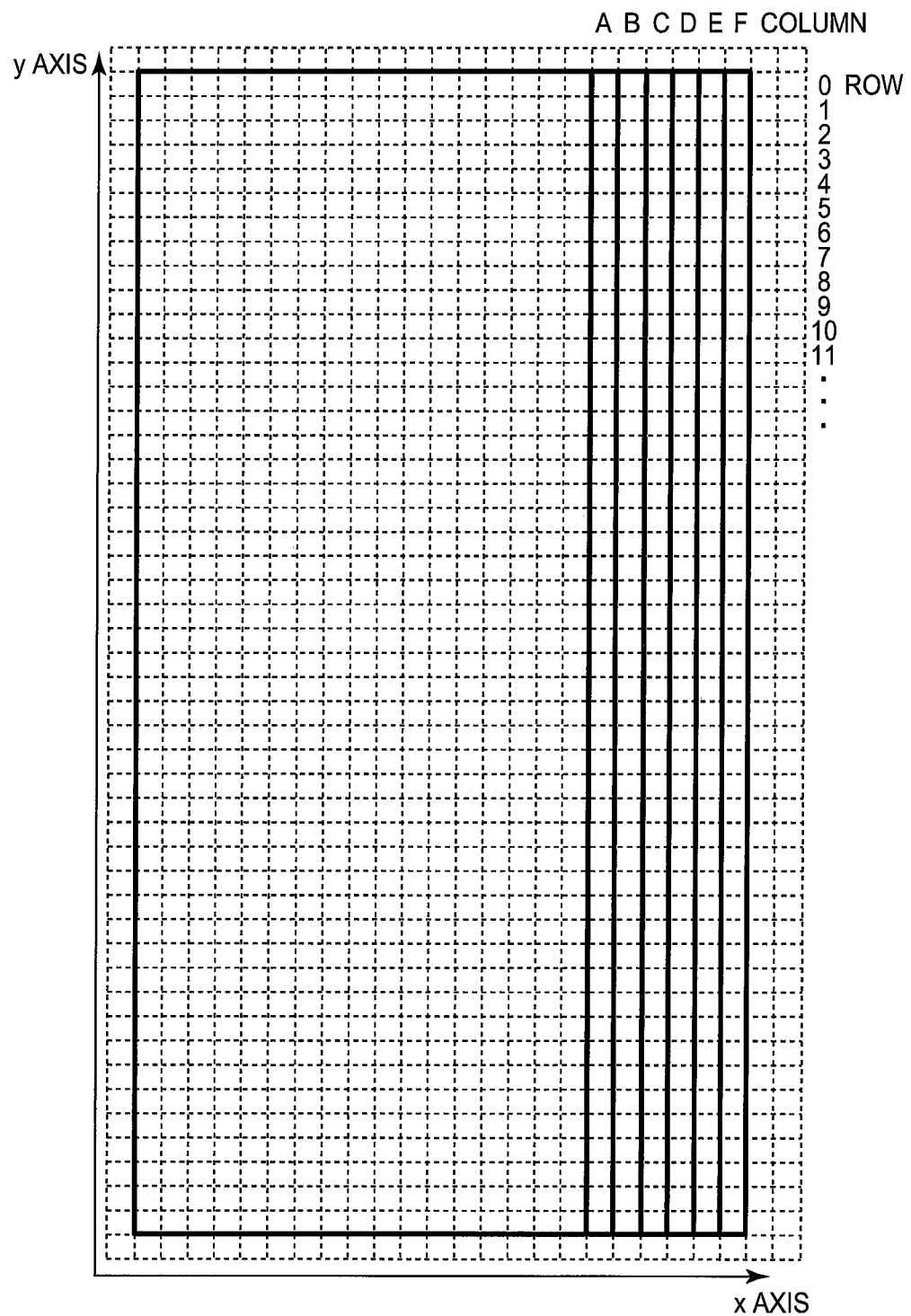
FIG. 33 illustrates a trimmed image after bend-correction according to the embodiment.

FIG. 32 illustrates a pre-correction block B1 and a post-correction block B2. The computer 4 calculates coordinates of points on the pre-correction block B1 on the basis of spline curves S0, Sn and S255. Then, the computer 4 converts the coordinates such that the spline curves S0, Sn and S255 become horizontal. Thereby, horizontal lines Q0, Qn and Q255 after conversion are made to be associated with the spline curves S0, Sn and S255. The computer 4 converts the coordinates of the points on the pre-correction block B1 on the basis of the association. Thereby, the bend is corrected and an image after the bend-correction shown in FIG. 33 is generated.

The bend-correction method illustrated here is one example, and other known bend-correction methods can be applied.

At Step S39, the computer 4 determines whether or not a read "$n^{th}$" trimmed image G4 is the last trimmed image G4. When determining that the "$n^{th}$" trimmed image G4 is not the last trimmed image G4, the computer 4 shifts the processing to Step S40.

At Step S40, the computer 4 sets "n=n+1" and shifts the processing to Step S37.

Step S37 to Step S40 are repeated until the last trimmed image G4 so that the bend correction is executed on the trimmed images G4 of all the pages P.

At Step S39, when determining that the read "$n^{th}$" trimmed image G4 is the last trimmed image G4, the computer 4 ends the bend-correction processing.

Thus, since the bend-correction processing is executed on the trimmed image G4 of each page P, deformation due to bend is corrected, and images suitable for reading are generated.

The bend-correction is complicated processing which requires much longer data-processing time than temporal trimming (cutting out). However, in the above bend-correction processing, since the computer 4 uses an interpolation technique, the time required for data processing is quite shorter as compared with a case where recognition of an image and bend-correction processing are executed on every single page P.

Further, since linear interpolation is used for interpolating the parameters, the computer 4 can interpolate the parameters for each page P through a simple calculation. Therefore, according to the embodiment, interpolation processing of the computer 4 is simplified. When accuracy is required, the computer 4 can use an advanced interpolation method.

In the above bend-correction processing, an example case where the bend-correction is executed on the trimmed images G4 is explained. Instead of the above example, it is also possible that the computer 4 executes the bend-correction on the basic images G or the size-adjusted images G3.

Figure 34A:
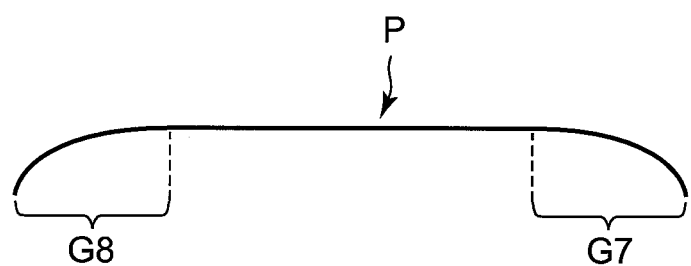
FIG. 34A illustrates an example of bend of a page according to the embodiment.
Figure 34B:
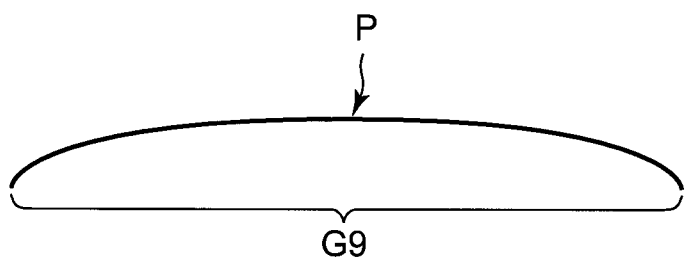
FIG. 34B illustrates an example of bend of a page according to the embodiment.
Figure 35:
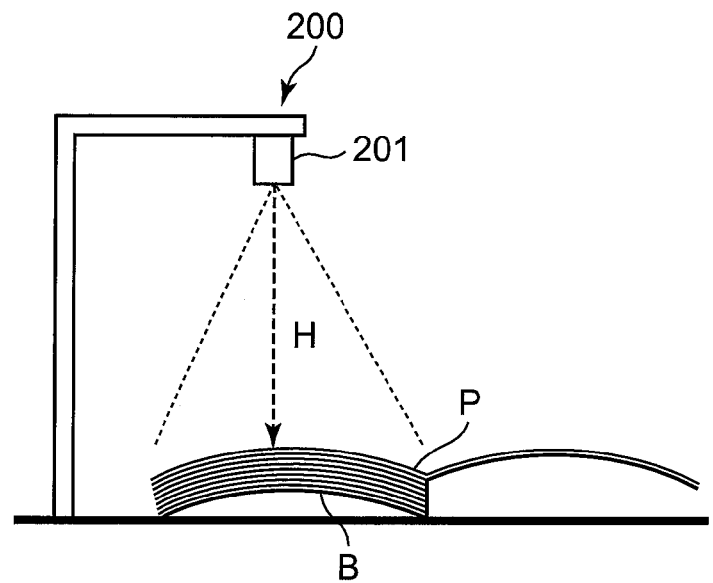
FIG. 35 schematically shows a state when a conventional image-reading device images the first page.
Figure 36:
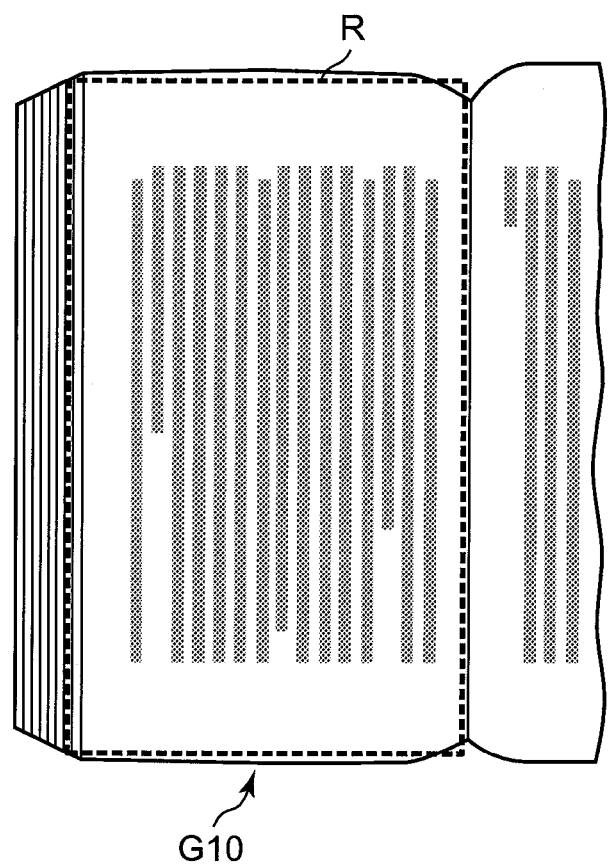
FIG. 36 illustrates an image of the first page imaged by the image-reading device in FIG. 35.
Figure 37:
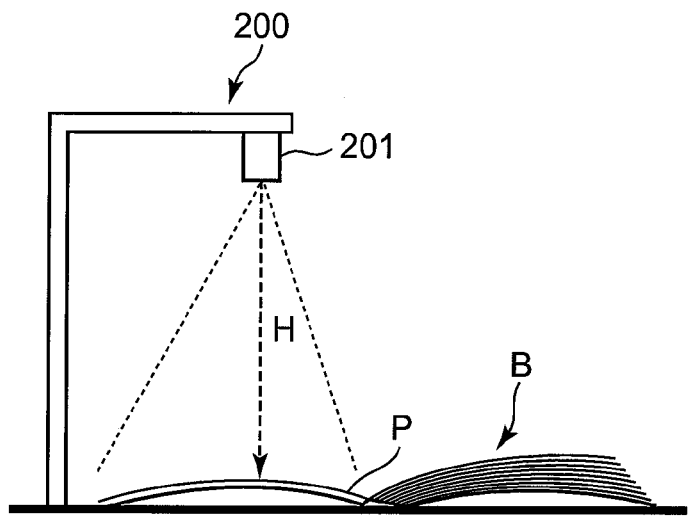
FIG. 37 schematically shows a state when the image-reading device in FIG. 35 images the last page.
Figure 38:
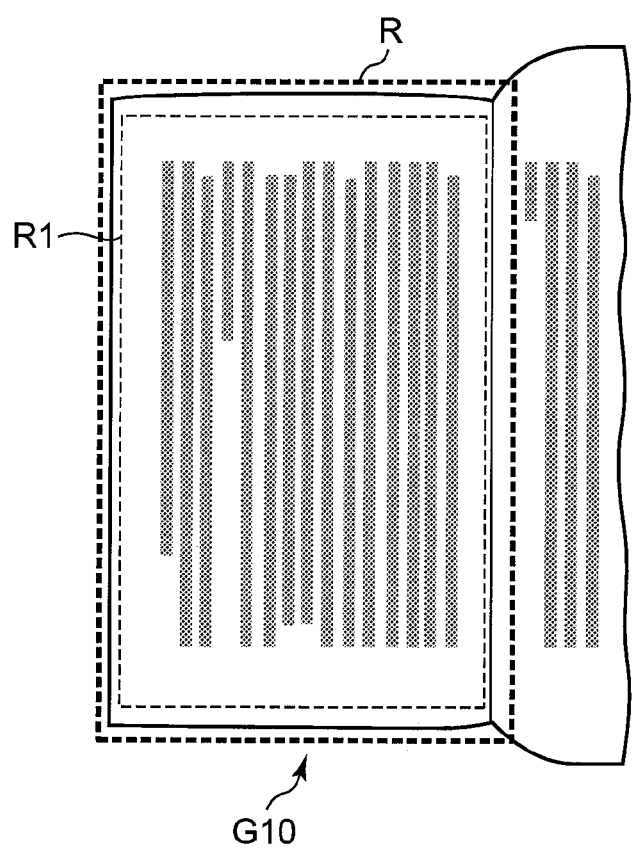
FIG. 38 illustrates an image of the last page imaged by the image-reading device in FIG. 35.

FIG. 34A and FIG. 34B illustrate examples of bend of pages P.

In the above embodiment, an example case where only an area around a seam of a page P is bent is explained. However, in some kinds of books, not only the area around a seam of a page P but also the edge on the opposite side of the seam bends as shown in FIG. 34A. Further, sometimes a page P bends as a whole as shown in FIG. 34B. In the case of FIG. 34A, the computer 4 executes the above bend-correction by specifying the control points for text lines in deformed areas G7, G8 on the seam side and the opposite side. On the other hand, in the case of FIG. 34B, the computer 4 determines that the whole page P is a deformed area G9 since the whole page P is deformed. The computer 4 executes the above bend-correction by specifying the control points for text lines in the deformed area G9.

In the above embodiment, example cases where the computer 4 determines the parameters such as the enlargement ratio S(n), the shift amount X(n) and the bend degree at the beginning of turning pages P and the end of turning pages P are explained. However, the range of pages (points in time) where each parameter is determined can include an acceptable range. That is, the computer 4 selects one page P appropriate for determining the parameter from pages P around the beginning of turning pages P, and determines the parameter for the predetermined area in the selected page P. In the same manner, the computer 4 selects one page P appropriate for determining the parameter from pages P around the end of turning pages P, and determines the parameter for the predetermined area in the selected page P. Thereby, the parameters are determined more accurately.

Specifically, sometimes pages at the beginning or the end of turning do not include a text or an image (information different from backgrounds) in the predetermined areas. In this case, parameters are unlikely to be determined accurately. However, if the page P for determining the parameter is selected from a plurality of pages P as described above, a text is likely to be included in the predetermined area, and the parameter is determined more accurately.

As specific processing, the computer 4 determines whether or not the predetermined area including a text exists in each page P which is a candidate for determining the parameter, and selects one page P wherein the predetermined area including a text exists for determining the parameter. At the selection, the computer 4 gives priority to a page P wherein the predetermined area including a text is positioned at an area (scope) most appropriate for determining the parameter. Thereby, the parameter is determined even more accurately.

It goes without saying that the computer 4 can determine parameters for pages other than pages P between the page P around the beginning of turning and the page P around the end of turning using formulas similar to the interpolation formulas described above.

Though several embodiments of the present invention are illustrated, the scope of the invention is not limited to the above embodiments but includes the scope of claims attached below and the scope of their equivalents.

What is claimed is:

1. An image-reading device which turns pages of a book, images each page of the book as a basic image using an imaging unit, and cuts out a predetermined area of the basic image for import as a trimmed image, said image-reading device comprising:
    an initial-parameter specification unit which specifies a parameter for the predetermined area of a page around a beginning of turning pages;
    a final-parameter specification unit which specifies a parameter for the predetermined area of a page around an end of turning pages;
    a determination unit which determines a parameter for a certain page of the book based on the parameters specified by the initial-parameter specification unit and the final-parameter specification unit; and
    a correction unit which corrects an image of the certain page based on the parameter determined by the determination unit.

2. The image-reading device according to claim 1, wherein the initial-parameter specification unit specifies the parameter by selecting a page with at least one of a text and an image in the predetermined area among pages around the beginning of turning pages, and
    wherein the final-parameter specification unit specifies the parameter by selecting a page with at least one of a text and an image in the predetermined area among pages around the end of turning pages.

3. The image-reading device according to claim 1, wherein the determination unit determines the parameter by executing linear correction using the parameters specified by the initial-parameter specification unit and the final-parameter specification unit and a page number.

4. The image-reading device according to claim 1, wherein the initial-parameter specification unit and the final-parameter specification unit specify the parameters based on a user's instruction which is input through an operation unit.

5. The image-reading device according to claim 1, wherein the initial-parameter specification unit and the final-parameter specification unit identify the predetermined areas by executing image processing on the basic images and specify the parameters based on the identified predetermined areas.

6. The image-reading device according to claim 5, further comprising an inquiry unit which asks whether the parameters are appropriate, the parameters being identified by executing the image processing on the basic images,
    wherein the initial-parameter specification unit and the final-parameter specification unit adjust the parameters according to a user response to the inquiry unit.

7. The image-reading device according to claim 1, wherein each of the parameters includes a size of the predetermined area.

8. The image-reading device according to claim 1, wherein each of the parameters includes a position of the predetermined area.

9. The image-reading device according to claim 1, wherein each of the parameters includes a bend degree of the predetermined area.

10. The image-reading device according to claim 1, further comprising:
    an initial-subject-distance specification unit which specifies a distance between the imaging unit and the page around the beginning of turning pages;
    a final-subject-distance specification unit which specifies a distance between the imaging unit and the page around the end of turning pages; and
    a subject-distance interpolation unit which interpolates a distance between the imaging unit and each page which is between the page around the beginning of turning pages and the page around the end of turning pages based on the distances specified by the initial-subject-distance specification unit and the final-subject-distance specification unit.

11. An image-reading method for turning pages of a book, imaging each page of the book as a basic image using an imaging unit, and cutting out a predetermined area of the basic image to import as a trimmed image, comprising:
    an initial-parameter specification processing of specifying a parameter for the predetermined area of a page around a beginning of turning pages;
    a final-parameter specification processing of specifying a parameter for the predetermined area of a page around an end of turning pages;
    a determination processing of determining a parameter for a certain page of the book based on the parameters specified in the initial-parameter specification processing and the final-parameter specification processing; and
    a correction processing of correcting an image of the certain page based on the parameter determined in the determination processing.

12. A non-transitory computer readable storage medium having a program stored thereon for turning pages of a book, imaging each page of the book as a basic image using an imaging unit, and cutting out a predetermined area of the basic image to import as a trimmed image, the program comprising computer-executable instructions to perform:
    an initial-parameter specification processing of specifying a parameter for the predetermined area of a page around a beginning of turning pages;
    a final-parameter specification processing of specifying a parameter for the predetermined area of a page around an end of turning pages;
    a determination processing of determining a parameter for a certain page of the book based on the parameters specified in the initial-parameter specification processing and the final-parameter specification processing; and
    a correction processing of correcting an image of the certain page based on the parameter determined in the determination processing.

* * * * *